US010296160B2

(12) United States Patent
Shah et al.

(10) Patent No.: US 10,296,160 B2
(45) Date of Patent: May 21, 2019

(54) METHOD FOR EXTRACTING SALIENT DIALOG USAGE FROM LIVE DATA

(71) Applicant: Apple Inc., Cupertino, CA (US)

(72) Inventors: Rushin N. Shah, Cupertino, CA (US); Devang K. Naik, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 676 days.

(21) Appl. No.: 14/099,776

(22) Filed: Dec. 6, 2013

(65) Prior Publication Data

US 2015/0161521 A1     Jun. 11, 2015

(51) Int. Cl.
*G06F 17/27*     (2006.01)
*G06F 3/0481*     (2013.01)
*G06F 15/18*     (2006.01)

(52) U.S. Cl.
CPC .......... *G06F 3/0481* (2013.01); *G06F 17/278* (2013.01)

(58) Field of Classification Search
CPC ...... G06N 99/005; G06N 5/025; G06N 7/005; G06K 9/6256; G06K 9/6269
USPC .......................................................... 706/12
See application file for complete search history.

(56) References Cited

U.S. PATENT DOCUMENTS

| | | |
|---|---|---|
| 3,704,345 A | 11/1972 | Coker et al. |
| 3,828,132 A | 8/1974 | Flanagan et al. |
| 3,979,557 A | 9/1976 | Schulman et al. |
| 4,278,838 A | 7/1981 | Antonov |
| 4,282,405 A | 8/1981 | Taguchi |
| 4,310,721 A | 1/1982 | Manley et al. |
| 4,348,553 A | 9/1982 | Baker et al. |
| 4,653,021 A | 3/1987 | Takagi |

(Continued)

FOREIGN PATENT DOCUMENTS

| | | |
|---|---|---|
| CH | 681573 A5 | 4/1993 |
| DE | 3837590 A1 | 5/1990 |

(Continued)

OTHER PUBLICATIONS

Hermansky, H., "Perceptual Linear Predictive (PLP) Analysis of Speech", Journal of the Acoustical Society of America, vol. 87, No. 4, Apr. 1990, pp. 1738-1752.

(Continued)

*Primary Examiner* — Scott A. Waldron
*Assistant Examiner* — Viker A Lamardo
(74) *Attorney, Agent, or Firm* — Dentons US LLP

(57) ABSTRACT

Systems and processes are disclosed for virtual assistant request recognition using live usage data and data relating to future events. User requests that are received but not recognized can be used to generate candidate request templates. A count can be associated with each candidate request template and can be incremented each time a matching candidate request template is received. When a count reaches a threshold level, the corresponding candidate request template can be used to train a virtual assistant to recognize and respond to similar user requests in the future. In addition, data relating to future events can be mined to extract relevant information that can be used to populate both recognized user request templates and candidate user request templates. Populated user request templates (e.g., whole expected utterances) can then be used to recognize user requests and disambiguate user intent as future events become relevant.

25 Claims, 7 Drawing Sheets

(56) References Cited

U.S. PATENT DOCUMENTS

| | | |
|---|---|---|
| 4,688,195 A | 8/1987 | Thompson et al. |
| 4,692,941 A | 9/1987 | Jacks et al. |
| 4,718,094 A | 1/1988 | Bahl et al. |
| 4,724,542 A | 2/1988 | Williford |
| 4,726,065 A | 2/1988 | Froessl |
| 4,727,354 A | 2/1988 | Lindsay |
| 4,776,016 A | 10/1988 | Hansen |
| 4,783,807 A | 11/1988 | Marley |
| 4,811,243 A | 3/1989 | Racine |
| 4,819,271 A | 4/1989 | Bahl et al. |
| 4,827,518 A | 5/1989 | Feustel et al. |
| 4,827,520 A | 5/1989 | Zeinstra |
| 4,829,576 A | 5/1989 | Porter |
| 4,833,712 A | 5/1989 | Bahl et al. |
| 4,839,853 A | 6/1989 | Deerwester et al. |
| 4,852,168 A | 7/1989 | Sprague |
| 4,862,504 A | 8/1989 | Nomura |
| 4,878,230 A | 10/1989 | Murakami et al. |
| 4,903,305 A | 2/1990 | Gillick et al. |
| 4,905,163 A | 2/1990 | Garber et al. |
| 4,914,586 A | 4/1990 | Swinehart et al. |
| 4,914,590 A | 4/1990 | Loatman et al. |
| 4,944,013 A | 7/1990 | Gouvianakis et al. |
| 4,955,047 A | 9/1990 | Morganstein et al. |
| 4,965,763 A | 10/1990 | Zamora |
| 4,974,191 A | 11/1990 | Amirghodsi et al. |
| 4,977,598 A | 12/1990 | Doddington et al. |
| 4,992,972 A | 2/1991 | Brooks et al. |
| 5,010,574 A | 4/1991 | Wang |
| 5,020,112 A | 5/1991 | Chou |
| 5,021,971 A | 6/1991 | Lindsay |
| 5,022,081 A | 6/1991 | Hirose et al. |
| 5,027,406 A | 6/1991 | Roberts et al. |
| 5,031,217 A | 7/1991 | Nishimura |
| 5,032,989 A | 7/1991 | Tornetta |
| 5,040,218 A | 8/1991 | Vitale et al. |
| 5,047,617 A | 9/1991 | Shepard et al. |
| 5,057,915 A | 10/1991 | Von Kohorn |
| 5,072,452 A | 12/1991 | Brown et al. |
| 5,091,945 A | 2/1992 | Kleijn |
| 5,127,053 A | 6/1992 | Koch |
| 5,127,055 A | 6/1992 | Larkey |
| 5,128,672 A | 7/1992 | Kaehler |
| 5,133,011 A | 7/1992 | McKiel, Jr. |
| 5,142,584 A | 8/1992 | Ozawa |
| 5,164,900 A | 11/1992 | Bernath |
| 5,165,007 A | 11/1992 | Bahl et al. |
| 5,179,627 A | 1/1993 | Sweet et al. |
| 5,179,652 A | 1/1993 | Rozmanith et al. |
| 5,194,950 A | 3/1993 | Murakami et al. |
| 5,197,005 A | 3/1993 | Shwartz et al. |
| 5,199,077 A | 3/1993 | Wilcox et al. |
| 5,202,952 A | 4/1993 | Gillick et al. |
| 5,208,862 A | 5/1993 | Ozawa |
| 5,216,747 A | 6/1993 | Hardwick et al. |
| 5,220,639 A | 6/1993 | Lee |
| 5,220,657 A | 6/1993 | Bly et al. |
| 5,222,146 A | 6/1993 | Bahl et al. |
| 5,230,036 A | 7/1993 | Akamine et al. |
| 5,235,680 A | 8/1993 | Bijnagte |
| 5,267,345 A | 11/1993 | Brown et al. |
| 5,268,990 A | 12/1993 | Cohen et al. |
| 5,282,265 A | 1/1994 | Rohra Suda et al. |
| RE34,562 E | 3/1994 | Murakami et al. |
| 5,291,286 A | 3/1994 | Murakami et al. |
| 5,293,448 A | 3/1994 | Honda |
| 5,293,452 A | 3/1994 | Picone et al. |
| 5,297,170 A | 3/1994 | Eyuboglu et al. |
| 5,301,109 A | 4/1994 | Landauer et al. |
| 5,303,406 A | 4/1994 | Hansen et al. |
| 5,309,359 A | 5/1994 | Katz et al. |
| 5,317,507 A | 5/1994 | Gallant |
| 5,317,647 A | 5/1994 | Pagallo |
| 5,325,297 A | 6/1994 | Bird et al. |
| 5,325,298 A | 6/1994 | Gallant |
| 5,327,498 A | 7/1994 | Hamon |
| 5,333,236 A | 7/1994 | Bahl et al. |
| 5,333,275 A | 7/1994 | Wheatley et al. |
| 5,345,536 A | 9/1994 | Hoshimi et al. |
| 5,349,645 A | 9/1994 | Zhao |
| 5,353,377 A | 10/1994 | Kuroda et al. |
| 5,377,301 A | 12/1994 | Rosenberg et al. |
| 5,384,892 A | 1/1995 | Strong |
| 5,384,893 A | 1/1995 | Hutchins |
| 5,386,494 A | 1/1995 | White |
| 5,386,556 A | 1/1995 | Hedin et al. |
| 5,390,279 A | 2/1995 | Strong |
| 5,396,625 A | 3/1995 | Parkes |
| 5,400,434 A | 3/1995 | Pearson |
| 5,404,295 A | 4/1995 | Katz et al. |
| 5,412,756 A | 5/1995 | Bauman et al. |
| 5,412,804 A | 5/1995 | Krishna |
| 5,412,806 A | 5/1995 | Du et al. |
| 5,418,951 A | 5/1995 | Damashek |
| 5,424,947 A | 6/1995 | Nagao et al. |
| 5,434,777 A | 7/1995 | Luciw |
| 5,444,823 A | 8/1995 | Nguyen |
| 5,455,888 A | 10/1995 | Iyengar et al. |
| 5,469,529 A | 11/1995 | Bimbot et al. |
| 5,471,611 A | 11/1995 | McGregor |
| 5,475,587 A | 12/1995 | Anick et al. |
| 5,479,488 A | 12/1995 | Lennig et al. |
| 5,491,772 A | 2/1996 | Hardwick et al. |
| 5,493,677 A | 2/1996 | Balogh et al. |
| 5,495,604 A | 2/1996 | Harding et al. |
| 5,502,790 A | 3/1996 | Yi |
| 5,502,791 A | 3/1996 | Nishimura et al. |
| 5,515,475 A | 5/1996 | Gupta et al. |
| 5,536,902 A | 7/1996 | Serra et al. |
| 5,537,618 A | 7/1996 | Boulton et al. |
| 5,574,823 A | 11/1996 | Hassanein et al. |
| 5,577,241 A | 11/1996 | Spencer |
| 5,578,808 A | 11/1996 | Taylor |
| 5,579,436 A | 11/1996 | Chou et al. |
| 5,581,655 A | 12/1996 | Cohen et al. |
| 5,584,024 A | 12/1996 | Shwartz |
| 5,596,676 A | 1/1997 | Swaminathan et al. |
| 5,596,994 A | 1/1997 | Bro |
| 5,608,624 A | 3/1997 | Luciw |
| 5,613,036 A | 3/1997 | Strong |
| 5,617,507 A | 4/1997 | Lee et al. |
| 5,619,694 A | 4/1997 | Shimazu |
| 5,621,859 A | 4/1997 | Schwartz et al. |
| 5,621,903 A | 4/1997 | Luciw et al. |
| 5,642,464 A | 6/1997 | Yue et al. |
| 5,642,519 A | 6/1997 | Martin |
| 5,644,727 A | 7/1997 | Atkins |
| 5,664,055 A | 9/1997 | Kroon |
| 5,675,819 A | 10/1997 | Schuetze |
| 5,682,539 A | 10/1997 | Conrad et al. |
| 5,687,077 A | 11/1997 | Gough, Jr. |
| 5,696,962 A | 12/1997 | Kupiec |
| 5,701,400 A | 12/1997 | Amado |
| 5,706,442 A | 1/1998 | Anderson et al. |
| 5,710,886 A | 1/1998 | Christensen et al. |
| 5,712,957 A | 1/1998 | Waibel et al. |
| 5,715,468 A | 2/1998 | Budzinski |
| 5,721,827 A | 2/1998 | Logan et al. |
| 5,727,950 A | 3/1998 | Cook et al. |
| 5,729,694 A | 3/1998 | Holzrichter et al. |
| 5,732,216 A | 3/1998 | Logan et al. |
| 5,732,390 A | 3/1998 | Katayanagi et al. |
| 5,734,791 A | 3/1998 | Acero et al. |
| 5,737,734 A | 4/1998 | Schultz |
| 5,748,974 A | 5/1998 | Johnson |
| 5,749,081 A | 5/1998 | Whiteis |
| 5,759,101 A | 6/1998 | Von Kohorn |
| 5,790,978 A | 8/1998 | Olive et al. |
| 5,794,050 A | 8/1998 | Dahlgren et al. |
| 5,794,182 A | 8/1998 | Manduchi et al. |
| 5,794,207 A | 8/1998 | Walker et al. |
| 5,794,237 A | 8/1998 | Gore, Jr. |
| 5,799,276 A | 8/1998 | Komissarchik et al. |
| 5,822,743 A | 10/1998 | Gupta et al. |

(56) References Cited

U.S. PATENT DOCUMENTS

| | | |
|---|---|---|
| 5,825,881 A | 10/1998 | Colvin, Sr. |
| 5,826,261 A | 10/1998 | Spencer |
| 5,828,999 A | 10/1998 | Bellegarda et al. |
| 5,835,893 A | 11/1998 | Ushioda |
| 5,839,106 A | 11/1998 | Bellegarda |
| 5,845,255 A | 12/1998 | Mayaud |
| 5,857,184 A | 1/1999 | Lynch |
| 5,860,063 A | 1/1999 | Gorin et al. |
| 5,862,233 A | 1/1999 | Poletti |
| 5,864,806 A | 1/1999 | Mokbel et al. |
| 5,864,844 A | 1/1999 | James et al. |
| 5,867,799 A | 2/1999 | Lang et al. |
| 5,873,056 A | 2/1999 | Liddy et al. |
| 5,875,437 A | 2/1999 | Atkins |
| 5,884,323 A | 3/1999 | Hawkins et al. |
| 5,895,464 A | 4/1999 | Bhandari et al. |
| 5,895,466 A | 4/1999 | Goldberg et al. |
| 5,899,972 A | 5/1999 | Miyazawa et al. |
| 5,913,193 A | 6/1999 | Huang et al. |
| 5,915,249 A | 6/1999 | Spencer |
| 5,930,769 A | 7/1999 | Rose |
| 5,933,822 A | 8/1999 | Braden-Harder et al. |
| 5,936,926 A | 8/1999 | Yokouchi et al. |
| 5,940,811 A | 8/1999 | Norris |
| 5,941,944 A | 8/1999 | Messerly |
| 5,943,670 A | 8/1999 | Prager |
| 5,948,040 A | 9/1999 | DeLorme et al. |
| 5,956,699 A | 9/1999 | Wong et al. |
| 5,960,394 A | 9/1999 | Gould et al. |
| 5,960,422 A | 9/1999 | Prasad |
| 5,963,924 A | 10/1999 | Williams et al. |
| 5,966,126 A | 10/1999 | Szabo |
| 5,970,474 A | 10/1999 | LeRoy et al. |
| 5,974,146 A | 10/1999 | Randle et al. |
| 5,982,891 A | 11/1999 | Ginter et al. |
| 5,987,132 A | 11/1999 | Rowney |
| 5,987,140 A | 11/1999 | Rowney et al. |
| 5,987,404 A | 11/1999 | Della Pietra et al. |
| 5,987,440 A | 11/1999 | O'Neil et al. |
| 5,999,908 A | 12/1999 | Abelow |
| 6,016,471 A | 1/2000 | Kuhn et al. |
| 6,023,684 A | 2/2000 | Pearson |
| 6,024,288 A | 2/2000 | Gottlich et al. |
| 6,026,345 A | 2/2000 | Shah et al. |
| 6,026,375 A | 2/2000 | Hall et al. |
| 6,026,388 A | 2/2000 | Liddy et al. |
| 6,026,393 A | 2/2000 | Gupta et al. |
| 6,029,132 A | 2/2000 | Kuhn et al. |
| 6,038,533 A | 3/2000 | Buchsbaum et al. |
| 6,052,656 A | 4/2000 | Suda et al. |
| 6,055,514 A | 4/2000 | Wren |
| 6,055,531 A | 4/2000 | Bennett et al. |
| 6,064,960 A | 5/2000 | Bellegarda et al. |
| 6,070,139 A | 5/2000 | Miyazawa et al. |
| 6,070,147 A | 5/2000 | Harms et al. |
| 6,076,051 A | 6/2000 | Messerly et al. |
| 6,076,088 A | 6/2000 | Paik et al. |
| 6,078,914 A | 6/2000 | Redfern |
| 6,081,750 A | 6/2000 | Hoffberg et al. |
| 6,081,774 A | 6/2000 | de Hita et al. |
| 6,088,731 A | 7/2000 | Kiraly et al. |
| 6,094,649 A | 7/2000 | Bowen et al. |
| 6,105,865 A | 8/2000 | Hardesty |
| 6,108,627 A | 8/2000 | Sabourin |
| 6,119,101 A | 9/2000 | Peckover |
| 6,122,616 A | 9/2000 | Henton |
| 6,125,356 A | 9/2000 | Brockman et al. |
| 6,144,938 A | 11/2000 | Surace et al. |
| 6,173,261 B1 | 1/2001 | Arai et al. |
| 6,173,279 B1 | 1/2001 | Levin et al. |
| 6,188,999 B1 | 2/2001 | Moody |
| 6,195,641 B1 | 2/2001 | Loring et al. |
| 6,205,456 B1 | 3/2001 | Nakao |
| 6,208,971 B1 | 3/2001 | Bellegarda et al. |
| 6,233,559 B1 | 5/2001 | Balakrishnan |
| 6,233,578 B1 | 5/2001 | Machihara et al. |
| 6,246,981 B1 | 6/2001 | Papineni et al. |
| 6,260,024 B1 | 7/2001 | Shkedy |
| 6,266,637 B1 | 7/2001 | Donovan et al. |
| 6,275,824 B1 | 8/2001 | O'Flaherty et al. |
| 6,285,786 B1 | 9/2001 | Seni et al. |
| 6,308,149 B1 | 10/2001 | Gaussier et al. |
| 6,311,189 B1 | 10/2001 | deVries et al. |
| 6,317,594 B1 | 11/2001 | Gossman et al. |
| 6,317,707 B1 * | 11/2001 | Bangalore ............ G06F 17/274 704/255 |
| 6,317,831 B1 | 11/2001 | King |
| 6,321,092 B1 | 11/2001 | Fitch et al. |
| 6,334,103 B1 | 12/2001 | Surace et al. |
| 6,356,854 B1 | 3/2002 | Schubert et al. |
| 6,356,905 B1 | 3/2002 | Gershman et al. |
| 6,366,883 B1 | 4/2002 | Campbell et al. |
| 6,366,884 B1 | 4/2002 | Bellegarda et al. |
| 6,421,672 B1 | 7/2002 | McAllister et al. |
| 6,434,524 B1 | 8/2002 | Weber |
| 6,446,076 B1 | 9/2002 | Burkey et al. |
| 6,449,620 B1 | 9/2002 | Draper et al. |
| 6,453,281 B1 | 9/2002 | Walters et al. |
| 6,453,292 B2 | 9/2002 | Ramaswamy et al. |
| 6,460,029 B1 | 10/2002 | Fries et al. |
| 6,466,654 B1 | 10/2002 | Cooper et al. |
| 6,477,488 B1 | 11/2002 | Bellegarda |
| 6,487,534 B1 | 11/2002 | Thelen et al. |
| 6,499,013 B1 | 12/2002 | Weber |
| 6,501,937 B1 | 12/2002 | Ho et al. |
| 6,505,158 B1 | 1/2003 | Conkie |
| 6,505,175 B1 | 1/2003 | Silverman et al. |
| 6,505,183 B1 | 1/2003 | Loofbourrow et al. |
| 6,510,417 B1 | 1/2003 | Woods et al. |
| 6,513,063 B1 | 1/2003 | Julia et al. |
| 6,519,565 B1 | 2/2003 | Clements et al. |
| 6,523,061 B1 | 2/2003 | Halverson et al. |
| 6,523,172 B1 | 2/2003 | Martinez-Guerra et al. |
| 6,526,382 B1 | 2/2003 | Yuschik |
| 6,526,395 B1 | 2/2003 | Morris |
| 6,532,444 B1 | 3/2003 | Weber |
| 6,532,446 B1 | 3/2003 | King |
| 6,546,388 B1 | 4/2003 | Edlund et al. |
| 6,553,344 B2 | 4/2003 | Bellegarda et al. |
| 6,556,983 B1 | 4/2003 | Altschuler et al. |
| 6,584,464 B1 | 6/2003 | Warthen |
| 6,598,039 B1 | 7/2003 | Livowsky |
| 6,601,026 B2 | 7/2003 | Appelt et al. |
| 6,601,234 B1 | 7/2003 | Bowman-Amuah |
| 6,604,059 B2 | 8/2003 | Strubbe et al. |
| 6,615,172 B1 | 9/2003 | Bennett et al. |
| 6,615,175 B1 | 9/2003 | Gazdzinski |
| 6,615,220 B1 | 9/2003 | Austin et al. |
| 6,625,583 B1 | 9/2003 | Silverman et al. |
| 6,631,346 B1 | 10/2003 | Karaorman et al. |
| 6,633,846 B1 | 10/2003 | Bennett et al. |
| 6,647,260 B2 | 11/2003 | Dusse et al. |
| 6,650,735 B2 | 11/2003 | Burton et al. |
| 6,654,740 B2 | 11/2003 | Tokuda et al. |
| 6,665,639 B2 | 12/2003 | Mozer et al. |
| 6,665,640 B1 | 12/2003 | Bennett et al. |
| 6,665,641 B1 | 12/2003 | Coorman et al. |
| 6,684,187 B1 | 1/2004 | Conkie |
| 6,691,064 B2 | 2/2004 | Vroman |
| 6,691,111 B2 | 2/2004 | Lazaridis et al. |
| 6,691,151 B1 | 2/2004 | Cheyer et al. |
| 6,697,780 B1 | 2/2004 | Beutnagel et al. |
| 6,697,824 B1 | 2/2004 | Bowman-Amuah |
| 6,701,294 B1 | 3/2004 | Ball et al. |
| 6,711,585 B1 | 3/2004 | Cooperman et al. |
| 6,718,324 B2 | 4/2004 | Edlund et al. |
| 6,721,706 B1 * | 4/2004 | Strubbe ............... G10L 15/18 704/257 |
| 6,721,728 B2 | 4/2004 | McGreevy |
| 6,728,679 B1 * | 4/2004 | Strubbe ............... G06F 3/011 704/270.1 |
| 6,731,307 B1 * | 5/2004 | Strubbe ............... G06F 3/004 704/E17.002 |
| 6,735,632 B1 | 5/2004 | Kiraly et al. |

(56) References Cited

U.S. PATENT DOCUMENTS

| | | | |
|---|---|---|---|
| 6,742,021 B1 | 5/2004 | Halverson et al. |
| 6,757,362 B1 | 6/2004 | Cooper et al. |
| 6,757,718 B1 | 6/2004 | Halverson et al. |
| 6,766,320 B1 | 7/2004 | Wang et al. |
| 6,778,951 B1 | 8/2004 | Contractor |
| 6,778,952 B2 | 8/2004 | Bellegarda |
| 6,778,962 B1 | 8/2004 | Kasai et al. |
| 6,778,970 B2 | 8/2004 | Au |
| 6,792,082 B1 | 9/2004 | Levine |
| 6,795,808 B1 * | 9/2004 | Strubbe ............ G06F 17/30702 704/270 |
| 6,807,574 B1 | 10/2004 | Partovi et al. |
| 6,810,379 B1 | 10/2004 | Vermeulen et al. |
| 6,813,491 B1 | 11/2004 | McKinney |
| 6,829,603 B1 | 12/2004 | Chai et al. |
| 6,832,194 B1 | 12/2004 | Mozer et al. |
| 6,842,767 B1 | 1/2005 | Partovi et al. |
| 6,847,966 B1 | 1/2005 | Sommer et al. |
| 6,847,979 B2 | 1/2005 | Allemang et al. |
| 6,851,115 B1 | 2/2005 | Cheyer et al. |
| 6,859,931 B1 | 2/2005 | Cheyer et al. |
| 6,895,380 B2 | 5/2005 | Sepe, Jr. |
| 6,895,558 B1 | 5/2005 | Loveland |
| 6,901,399 B1 | 5/2005 | Corston et al. |
| 6,912,499 B1 | 6/2005 | Sabourin et al. |
| 6,924,828 B1 | 8/2005 | Hirsch |
| 6,928,614 B1 | 8/2005 | Everhart |
| 6,931,384 B1 | 8/2005 | Horvitz et al. |
| 6,934,684 B2 | 8/2005 | Alpdemir et al. |
| 6,937,975 B1 | 8/2005 | Elworthy |
| 6,937,986 B2 | 8/2005 | Denenberg et al. |
| 6,964,023 B2 | 11/2005 | Maes et al. |
| 6,980,949 B2 | 12/2005 | Ford |
| 6,980,955 B2 | 12/2005 | Okutani et al. |
| 6,985,865 B1 | 1/2006 | Packingham et al. |
| 6,988,071 B1 | 1/2006 | Gazdzinski |
| 6,996,531 B2 | 2/2006 | Korall et al. |
| 6,999,927 B2 | 2/2006 | Mozer et al. |
| 7,020,685 B1 | 3/2006 | Chen et al. |
| 7,024,363 B1 | 4/2006 | Comerford et al. |
| 7,027,974 B1 | 4/2006 | Busch et al. |
| 7,036,128 B1 | 4/2006 | Julia et al. |
| 7,050,977 B1 | 5/2006 | Bennett |
| 7,058,569 B2 | 6/2006 | Coorman et al. |
| 7,062,428 B2 | 6/2006 | Hogenhout et al. |
| 7,069,560 B1 | 6/2006 | Cheyer et al. |
| 7,092,887 B2 | 8/2006 | Mozer et al. |
| 7,092,928 B1 | 8/2006 | Elad et al. |
| 7,093,693 B1 | 8/2006 | Gazdzinski |
| 7,127,046 B1 | 10/2006 | Smith et al. |
| 7,127,403 B1 | 10/2006 | Saylor et al. |
| 7,136,710 B1 | 11/2006 | Hoffberg et al. |
| 7,137,126 B1 | 11/2006 | Coffman et al. |
| 7,139,714 B2 | 11/2006 | Bennett et al. |
| 7,139,722 B2 | 11/2006 | Perrella et al. |
| 7,152,070 B1 | 12/2006 | Musick et al. |
| 7,177,798 B2 | 2/2007 | Hsu et al. |
| 7,197,460 B1 | 3/2007 | Gupta et al. |
| 7,200,559 B2 | 4/2007 | Wang |
| 7,203,646 B2 | 4/2007 | Bennett |
| 7,216,073 B2 | 5/2007 | Lavi et al. |
| 7,216,080 B2 | 5/2007 | Tsiao et al. |
| 7,225,125 B2 | 5/2007 | Bennett et al. |
| 7,233,790 B2 | 6/2007 | Kjellberg et al. |
| 7,233,904 B2 | 6/2007 | Luisi |
| 7,266,496 B2 | 9/2007 | Wang et al. |
| 7,277,854 B2 | 10/2007 | Bennett et al. |
| 7,290,039 B1 | 10/2007 | Lisitsa et al. |
| 7,299,033 B2 | 11/2007 | Kjellberg et al. |
| 7,310,600 B1 | 12/2007 | Garner et al. |
| 7,324,947 B2 | 1/2008 | Jordan et al. |
| 7,349,953 B2 | 3/2008 | Lisitsa et al. |
| 7,376,556 B2 | 5/2008 | Bennett |
| 7,376,645 B2 | 5/2008 | Bernard |
| 7,379,874 B2 | 5/2008 | Schmid et al. |
| 7,386,449 B2 | 6/2008 | Sun et al. |
| 7,389,224 B1 | 6/2008 | Elworthy |
| 7,392,185 B2 | 6/2008 | Bennett |
| 7,398,209 B2 | 7/2008 | Kennewick et al. |
| 7,403,938 B2 | 7/2008 | Harrison et al. |
| 7,409,337 B1 | 8/2008 | Potter et al. |
| 7,415,100 B2 | 8/2008 | Cooper et al. |
| 7,418,392 B1 | 8/2008 | Mozer et al. |
| 7,426,467 B2 | 9/2008 | Nashida et al. |
| 7,427,024 B1 | 9/2008 | Gazdzinski et al. |
| 7,447,635 B1 | 11/2008 | Konopka et al. |
| 7,454,351 B2 | 11/2008 | Jeschke et al. |
| 7,467,087 B1 | 12/2008 | Gillick et al. |
| 7,475,010 B2 | 1/2009 | Chao |
| 7,483,894 B2 | 1/2009 | Cao |
| 7,487,089 B2 | 2/2009 | Mozer |
| 7,496,498 B2 | 2/2009 | Chu et al. |
| 7,496,512 B2 | 2/2009 | Zhao et al. |
| 7,502,738 B2 | 3/2009 | Kennewick et al. |
| 7,508,373 B2 | 3/2009 | Lin et al. |
| 7,522,927 B2 | 4/2009 | Fitch et al. |
| 7,523,108 B2 | 4/2009 | Cao |
| 7,526,466 B2 | 4/2009 | Au |
| 7,529,671 B2 | 5/2009 | Rockenbeck et al. |
| 7,529,676 B2 | 5/2009 | Koyama |
| 7,539,656 B2 | 5/2009 | Fratkina et al. |
| 7,546,382 B2 | 6/2009 | Healey et al. |
| 7,548,895 B2 | 6/2009 | Pulsipher |
| 7,552,055 B2 | 6/2009 | Lecoeuche |
| 7,555,431 B2 | 6/2009 | Bennett |
| 7,558,730 B2 | 7/2009 | Davis et al. |
| 7,571,106 B2 | 8/2009 | Cao et al. |
| 7,599,918 B2 | 10/2009 | Shen et al. |
| 7,620,549 B2 | 11/2009 | Di Cristo et al. |
| 7,624,007 B2 | 11/2009 | Bennett |
| 7,634,409 B2 | 12/2009 | Kennewick et al. |
| 7,636,657 B2 | 12/2009 | Ju et al. |
| 7,640,160 B2 | 12/2009 | Di Cristo et al. |
| 7,647,225 B2 | 1/2010 | Bennett et al. |
| 7,657,424 B2 | 2/2010 | Bennett |
| 7,664,638 B2 | 2/2010 | Cooper et al. |
| 7,672,841 B2 | 3/2010 | Bennett |
| 7,676,026 B1 | 3/2010 | Baxter, Jr. |
| 7,684,985 B2 | 3/2010 | Dominach et al. |
| 7,693,715 B2 | 4/2010 | Hwang et al. |
| 7,693,720 B2 | 4/2010 | Kennewick et al. |
| 7,698,131 B2 | 4/2010 | Bennett |
| 7,702,500 B2 | 4/2010 | Blaedow |
| 7,702,508 B2 | 4/2010 | Bennett |
| 7,707,027 B2 | 4/2010 | Balchandran et al. |
| 7,707,032 B2 | 4/2010 | Wang et al. |
| 7,707,267 B2 | 4/2010 | Lisitsa et al. |
| 7,711,565 B1 | 5/2010 | Gazdzinski |
| 7,711,672 B2 | 5/2010 | Au |
| 7,716,056 B2 | 5/2010 | Weng et al. |
| 7,720,674 B2 | 5/2010 | Kaiser et al. |
| 7,720,683 B1 | 5/2010 | Vermeulen et al. |
| 7,721,301 B2 | 5/2010 | Wong et al. |
| 7,725,307 B2 | 5/2010 | Bennett |
| 7,725,318 B2 | 5/2010 | Gavalda et al. |
| 7,725,320 B2 | 5/2010 | Bennett |
| 7,725,321 B2 | 5/2010 | Bennett |
| 7,729,904 B2 | 6/2010 | Bennett |
| 7,729,916 B2 | 6/2010 | Coffman et al. |
| 7,734,461 B2 | 6/2010 | Kwak et al. |
| 7,747,616 B2 | 6/2010 | Yamada et al. |
| 7,752,152 B2 | 7/2010 | Paek et al. |
| 7,756,868 B2 | 7/2010 | Lee |
| 7,774,204 B2 | 8/2010 | Mozer et al. |
| 7,783,486 B2 | 8/2010 | Rosser et al. |
| 7,801,729 B2 | 9/2010 | Mozer |
| 7,809,570 B2 | 10/2010 | Kennewick et al. |
| 7,809,610 B2 | 10/2010 | Cao |
| 7,818,176 B2 | 10/2010 | Freeman et al. |
| 7,822,608 B2 | 10/2010 | Cross, Jr. et al. |
| 7,826,945 B2 | 11/2010 | Zhang et al. |
| 7,831,426 B2 | 11/2010 | Bennett |
| 7,840,400 B2 | 11/2010 | Lavi et al. |
| 7,840,447 B2 | 11/2010 | Kleinrock et al. |

(56) References Cited

U.S. PATENT DOCUMENTS

| | | |
|---|---|---|
| 7,853,574 B2 | 12/2010 | Kraenzel et al. |
| 7,853,664 B1 | 12/2010 | Wang et al. |
| 7,873,519 B2 | 1/2011 | Bennett |
| 7,873,654 B2 | 1/2011 | Bernard |
| 7,881,936 B2 | 2/2011 | Longe et al. |
| 7,890,652 B2 | 2/2011 | Bull et al. |
| 7,912,702 B2 | 3/2011 | Bennett |
| 7,917,367 B2 | 3/2011 | Di Cristo et al. |
| 7,917,497 B2 | 3/2011 | Harrison et al. |
| 7,920,678 B2 | 4/2011 | Cooper et al. |
| 7,925,525 B2 | 4/2011 | Chin |
| 7,930,168 B2 | 4/2011 | Weng et al. |
| 7,949,529 B2 | 5/2011 | Weider et al. |
| 7,949,534 B2 | 5/2011 | Davis et al. |
| 7,974,844 B2 | 7/2011 | Sumita |
| 7,974,972 B2 | 7/2011 | Cao |
| 7,983,915 B2 | 7/2011 | Knight et al. |
| 7,983,917 B2 | 7/2011 | Kennewick et al. |
| 7,983,997 B2 | 7/2011 | Allen et al. |
| 7,986,431 B2 | 7/2011 | Emori et al. |
| 7,987,151 B2 | 7/2011 | Schott et al. |
| 7,996,228 B2 | 8/2011 | Miller et al. |
| 8,000,453 B2 | 8/2011 | Cooper et al. |
| 8,005,679 B2 | 8/2011 | Jordan et al. |
| 8,015,006 B2 | 9/2011 | Kennewick et al. |
| 8,024,195 B2 | 9/2011 | Mozer et al. |
| 8,032,383 B1 | 10/2011 | Bhardwaj et al. |
| 8,036,901 B2 | 10/2011 | Mozer |
| 8,041,570 B2 | 10/2011 | Mirkovic et al. |
| 8,041,611 B2 | 10/2011 | Kleinrock et al. |
| 8,046,374 B1* | 10/2011 | Bromwich ............ G06F 21/552 707/759 |
| 8,055,708 B2 | 11/2011 | Chitsaz et al. |
| 8,065,155 B1 | 11/2011 | Gazdzinski |
| 8,065,156 B2 | 11/2011 | Gazdzinski |
| 8,069,046 B2 | 11/2011 | Kennewick et al. |
| 8,073,681 B2 | 12/2011 | Baldwin et al. |
| 8,078,473 B1 | 12/2011 | Gazdzinski |
| 8,082,153 B2 | 12/2011 | Coffman et al. |
| 8,095,364 B2 | 1/2012 | Longe et al. |
| 8,099,289 B2 | 1/2012 | Mozer et al. |
| 8,107,401 B2 | 1/2012 | John et al. |
| 8,112,275 B2 | 2/2012 | Kennewick et al. |
| 8,112,280 B2 | 2/2012 | Lu |
| 8,117,037 B2 | 2/2012 | Gazdzinski |
| 8,131,557 B2 | 3/2012 | Davis et al. |
| 8,140,335 B2 | 3/2012 | Kennewick et al. |
| 8,165,886 B1 | 4/2012 | Gagnon et al. |
| 8,166,019 B1 | 4/2012 | Lee et al. |
| 8,190,359 B2 | 5/2012 | Bourne |
| 8,195,467 B2 | 6/2012 | Mozer et al. |
| 8,204,238 B2 | 6/2012 | Mozer |
| 8,205,788 B1 | 6/2012 | Gazdzinski et al. |
| 8,219,407 B1 | 7/2012 | Roy et al. |
| 8,285,551 B2 | 10/2012 | Gazdzinski |
| 8,285,553 B2 | 10/2012 | Gazdzinski |
| 8,290,778 B2 | 10/2012 | Gazdzinski |
| 8,290,781 B2 | 10/2012 | Gazdzinski |
| 8,296,146 B2 | 10/2012 | Gazdzinski |
| 8,296,153 B2 | 10/2012 | Gazdzinski |
| 8,296,383 B2 | 10/2012 | Lindahl |
| 8,301,456 B2 | 10/2012 | Gazdzinski |
| 8,311,834 B1 | 11/2012 | Gazdzinski |
| 8,370,158 B2 | 2/2013 | Gazdzinski |
| 8,371,503 B2 | 2/2013 | Gazdzinski |
| 8,374,871 B2* | 2/2013 | Ehsani ................ G10L 15/193 704/257 |
| 8,447,612 B2 | 5/2013 | Gazdzinski |
| 8,626,681 B1* | 1/2014 | Jurca ..................... G06F 15/18 706/12 |
| 9,330,659 B2* | 5/2016 | Ju ........................ G10L 15/063 |
| 2001/0047264 A1 | 11/2001 | Roundtree |
| 2002/0010584 A1 | 1/2002 | Schultz et al. |
| 2002/0032564 A1 | 3/2002 | Ehsani et al. |
| 2002/0035474 A1 | 3/2002 | Alpdemir |
| 2002/0046025 A1 | 4/2002 | Hain |
| 2002/0069063 A1 | 6/2002 | Buchner et al. |
| 2002/0077817 A1 | 6/2002 | Atal |
| 2002/0083068 A1* | 6/2002 | Quass ................... G06F 17/243 |
| 2002/0103641 A1 | 8/2002 | Kuo et al. |
| 2002/0116185 A1 | 8/2002 | Cooper et al. |
| 2002/0116189 A1 | 8/2002 | Yeh et al. |
| 2002/0164000 A1 | 11/2002 | Cohen et al. |
| 2002/0198714 A1 | 12/2002 | Zhou |
| 2003/0088414 A1 | 5/2003 | Huang et al. |
| 2003/0097210 A1 | 5/2003 | Horst et al. |
| 2003/0135740 A1 | 7/2003 | Talmor et al. |
| 2004/0135701 A1 | 7/2004 | Yasuda et al. |
| 2004/0199387 A1 | 10/2004 | Wang et al. |
| 2004/0220798 A1 | 11/2004 | Chi et al. |
| 2004/0236778 A1 | 11/2004 | Junqua et al. |
| 2004/0249637 A1* | 12/2004 | Baker ................ G10L 15/1822 704/239 |
| 2005/0002507 A1 | 1/2005 | Timmins et al. |
| 2005/0055403 A1 | 3/2005 | Brittan |
| 2005/0071332 A1 | 3/2005 | Ortega et al. |
| 2005/0080625 A1 | 4/2005 | Bennett et al. |
| 2005/0091118 A1 | 4/2005 | Fano |
| 2005/0102614 A1 | 5/2005 | Brockett et al. |
| 2005/0108001 A1 | 5/2005 | Aarskog |
| 2005/0114124 A1 | 5/2005 | Liu et al. |
| 2005/0119897 A1 | 6/2005 | Bennett et al. |
| 2005/0143972 A1 | 6/2005 | Gopalakrishnan et al. |
| 2005/0165607 A1 | 7/2005 | Di Fabbrizio et al. |
| 2005/0182629 A1 | 8/2005 | Coorman et al. |
| 2005/0196733 A1 | 9/2005 | Budra et al. |
| 2005/0273626 A1 | 12/2005 | Pearson et al. |
| 2005/0288936 A1 | 12/2005 | Busayapongchai et al. |
| 2006/0018492 A1 | 1/2006 | Chiu et al. |
| 2006/0106592 A1 | 5/2006 | Brockett et al. |
| 2006/0106594 A1 | 5/2006 | Brockett et al. |
| 2006/0106595 A1 | 5/2006 | Brockett et al. |
| 2006/0117002 A1 | 6/2006 | Swen |
| 2006/0122834 A1 | 6/2006 | Bennett |
| 2006/0143007 A1 | 6/2006 | Koh et al. |
| 2006/0217967 A1 | 9/2006 | Goertzen et al. |
| 2006/0235700 A1 | 10/2006 | Wong et al. |
| 2007/0041361 A1 | 2/2007 | Iso-Sipila |
| 2007/0055529 A1 | 3/2007 | Kanevsky et al. |
| 2007/0058832 A1 | 3/2007 | Hug et al. |
| 2007/0088556 A1 | 4/2007 | Andrew |
| 2007/0100790 A1* | 5/2007 | Cheyer ................... G09B 21/00 |
| 2007/0106674 A1 | 5/2007 | Agrawal et al. |
| 2007/0118377 A1 | 5/2007 | Badino et al. |
| 2007/0135949 A1 | 6/2007 | Snover et al. |
| 2007/0174188 A1 | 7/2007 | Fish |
| 2007/0185917 A1 | 8/2007 | Prahlad et al. |
| 2007/0282595 A1 | 12/2007 | Tunning et al. |
| 2008/0015864 A1 | 1/2008 | Ross et al. |
| 2008/0021708 A1 | 1/2008 | Bennett et al. |
| 2008/0034032 A1 | 2/2008 | Healey et al. |
| 2008/0052063 A1 | 2/2008 | Bennett et al. |
| 2008/0082332 A1 | 4/2008 | Mallett et al. |
| 2008/0082338 A1 | 4/2008 | O'Neil et al. |
| 2008/0120112 A1 | 5/2008 | Jordan et al. |
| 2008/0129520 A1 | 6/2008 | Lee |
| 2008/0140416 A1 | 6/2008 | Shostak |
| 2008/0140657 A1 | 6/2008 | Azvine et al. |
| 2008/0221903 A1 | 9/2008 | Kanevsky et al. |
| 2008/0228496 A1 | 9/2008 | Yu et al. |
| 2008/0247519 A1 | 10/2008 | Abella et al. |
| 2008/0249770 A1 | 10/2008 | Kim et al. |
| 2008/0256613 A1 | 10/2008 | Grover |
| 2008/0300878 A1 | 12/2008 | Bennett |
| 2008/0319763 A1 | 12/2008 | Di Fabbrizio et al. |
| 2009/0006100 A1 | 1/2009 | Badger et al. |
| 2009/0006343 A1 | 1/2009 | Platt et al. |
| 2009/0018835 A1 | 1/2009 | Cooper et al. |
| 2009/0030800 A1 | 1/2009 | Grois |
| 2009/0055179 A1 | 2/2009 | Cho et al. |
| 2009/0058823 A1 | 3/2009 | Kocienda |
| 2009/0076796 A1 | 3/2009 | Daraselia |
| 2009/0077165 A1 | 3/2009 | Rhodes et al. |
| 2009/0100049 A1 | 4/2009 | Cao |

(56) References Cited

U.S. PATENT DOCUMENTS

| | | |
|---|---|---|
| 2009/0112677 A1 | 4/2009 | Rhett |
| 2009/0150156 A1 | 6/2009 | Kennewick et al. |
| 2009/0157401 A1 | 6/2009 | Bennett |
| 2009/0164441 A1 | 6/2009 | Cheyer |
| 2009/0171664 A1 | 7/2009 | Kennewick et al. |
| 2009/0204409 A1 | 8/2009 | Mozer et al. |
| 2009/0287583 A1 | 11/2009 | Holmes |
| 2009/0290718 A1 | 11/2009 | Kahn et al. |
| 2009/0299745 A1 | 12/2009 | Kennewick et al. |
| 2009/0299849 A1 | 12/2009 | Cao et al. |
| 2009/0307162 A1 | 12/2009 | Bui et al. |
| 2010/0005081 A1 | 1/2010 | Bennett |
| 2010/0023320 A1 | 1/2010 | Di Cristo et al. |
| 2010/0036660 A1 | 2/2010 | Bennett |
| 2010/0042400 A1 | 2/2010 | Block et al. |
| 2010/0057435 A1* | 3/2010 | Kent .............. G06F 17/289 704/3 |
| 2010/0088020 A1 | 4/2010 | Sano et al. |
| 2010/0088100 A1 | 4/2010 | Lindahl |
| 2010/0131273 A1 | 5/2010 | Aley-Raz et al. |
| 2010/0138215 A1 | 6/2010 | Williams |
| 2010/0145700 A1 | 6/2010 | Kennewick et al. |
| 2010/0204986 A1 | 8/2010 | Kennewick et al. |
| 2010/0217604 A1 | 8/2010 | Baldwin et al. |
| 2010/0228540 A1 | 9/2010 | Bennett |
| 2010/0235341 A1 | 9/2010 | Bennett |
| 2010/0257160 A1 | 10/2010 | Cao |
| 2010/0262599 A1 | 10/2010 | Nitz |
| 2010/0277579 A1 | 11/2010 | Cho et al. |
| 2010/0278320 A1 | 11/2010 | Arsenault et al. |
| 2010/0280983 A1 | 11/2010 | Cho et al. |
| 2010/0286985 A1 | 11/2010 | Kennewick et al. |
| 2010/0299142 A1 | 11/2010 | Freeman et al. |
| 2010/0312547 A1* | 12/2010 | Van Os .............. G10L 15/26 704/9 |
| 2010/0318576 A1 | 12/2010 | Kim |
| 2010/0332235 A1* | 12/2010 | David .............. G06F 17/2785 704/275 |
| 2010/0332348 A1 | 12/2010 | Cao |
| 2011/0047072 A1 | 2/2011 | Ciurea |
| 2011/0060807 A1 | 3/2011 | Martin et al. |
| 2011/0082688 A1 | 4/2011 | Kim et al. |
| 2011/0112827 A1 | 5/2011 | Kennewick et al. |
| 2011/0112921 A1 | 5/2011 | Kennewick et al. |
| 2011/0119049 A1 | 5/2011 | Ylonen |
| 2011/0125540 A1 | 5/2011 | Jang et al. |
| 2011/0130958 A1 | 6/2011 | Stahl et al. |
| 2011/0131036 A1 | 6/2011 | DiCristo et al. |
| 2011/0131045 A1 | 6/2011 | Cristo et al. |
| 2011/0143811 A1 | 6/2011 | Rodriguez |
| 2011/0144999 A1 | 6/2011 | Jang et al. |
| 2011/0161076 A1 | 6/2011 | Davis et al. |
| 2011/0161309 A1 | 6/2011 | Lung et al. |
| 2011/0175810 A1 | 7/2011 | Markovic et al. |
| 2011/0184730 A1 | 7/2011 | LeBeau et al. |
| 2011/0218855 A1 | 9/2011 | Cao et al. |
| 2011/0231182 A1 | 9/2011 | Weider et al. |
| 2011/0231188 A1 | 9/2011 | Kennewick et al. |
| 2011/0238407 A1* | 9/2011 | Kent .............. G06F 17/289 704/3 |
| 2011/0264643 A1 | 10/2011 | Cao |
| 2011/0279368 A1 | 11/2011 | Klein et al. |
| 2011/0298585 A1 | 12/2011 | Barry |
| 2011/0306426 A1 | 12/2011 | Novak et al. |
| 2011/0314003 A1* | 12/2011 | Ju .............. G10L 15/1822 707/723 |
| 2012/0002820 A1 | 1/2012 | Leichter |
| 2012/0016678 A1* | 1/2012 | Gruber .............. G06F 17/3087 704/275 |
| 2012/0020490 A1 | 1/2012 | Leichter |
| 2012/0022787 A1 | 1/2012 | LeBeau et al. |
| 2012/0022857 A1 | 1/2012 | Baldwin et al. |
| 2012/0022860 A1 | 1/2012 | Lloyd et al. |
| 2012/0022868 A1 | 1/2012 | LeBeau et al. |
| 2012/0022869 A1 | 1/2012 | Lloyd et al. |
| 2012/0022870 A1 | 1/2012 | Kristjansson et al. |
| 2012/0022874 A1 | 1/2012 | Lloyd et al. |
| 2012/0022876 A1 | 1/2012 | LeBeau et al. |
| 2012/0023088 A1 | 1/2012 | Cheng et al. |
| 2012/0034904 A1 | 2/2012 | LeBeau et al. |
| 2012/0035908 A1 | 2/2012 | LeBeau et al. |
| 2012/0035924 A1 | 2/2012 | Jitkoff et al. |
| 2012/0035931 A1 | 2/2012 | LeBeau et al. |
| 2012/0035932 A1 | 2/2012 | Jitkoff et al. |
| 2012/0042343 A1 | 2/2012 | Laligand et al. |
| 2012/0137367 A1 | 5/2012 | Dupont et al. |
| 2012/0173464 A1 | 7/2012 | Tur et al. |
| 2012/0265528 A1* | 10/2012 | Gruber .............. G10L 15/18 704/235 |
| 2012/0271676 A1 | 10/2012 | Aravamudan et al. |
| 2012/0311583 A1 | 12/2012 | Gruber et al. |
| 2012/0330661 A1 | 12/2012 | Lindahl |
| 2013/0006638 A1 | 1/2013 | Lindahl |
| 2013/0110518 A1 | 5/2013 | Gruber et al. |
| 2013/0110520 A1 | 5/2013 | Cheyer et al. |
| 2013/0325979 A1* | 12/2013 | Mansfield .............. H04L 51/32 709/206 |
| 2014/0244254 A1* | 8/2014 | Ju .............. G10L 15/22 704/243 |
| 2015/0142851 A1* | 5/2015 | Gupta .............. G06F 17/30967 707/779 |

FOREIGN PATENT DOCUMENTS

| | | |
|---|---|---|
| DE | 19841541 B4 | 12/2007 |
| EP | 0138061 A1 | 4/1985 |
| EP | 0218859 A2 | 4/1987 |
| EP | 0262938 A1 | 4/1988 |
| EP | 0138061 B1 | 6/1988 |
| EP | 0293259 A2 | 11/1988 |
| EP | 0299572 A2 | 1/1989 |
| EP | 0313975 A2 | 5/1989 |
| EP | 0314908 A2 | 5/1989 |
| EP | 0327408 A2 | 8/1989 |
| EP | 0389271 A2 | 9/1990 |
| EP | 0411675 A2 | 2/1991 |
| EP | 0559349 A1 | 9/1993 |
| EP | 0570660 A1 | 11/1993 |
| EP | 0863453 A1 | 9/1998 |
| EP | 0559349 B1 | 1/1999 |
| EP | 1229496 A2 | 8/2002 |
| EP | 1245023 A1 | 10/2002 |
| EP | 2109295 A1 | 10/2009 |
| GB | 2293667 A | 4/1996 |
| JP | 6-19965 A | 1/1994 |
| JP | 2001-125896 A | 5/2001 |
| JP | 2002-24212 A | 1/2002 |
| JP | 2003-517158 A | 5/2003 |
| JP | 2009-36999 A | 2/2009 |
| KR | 10-0757496 B1 | 9/2007 |
| KR | 10-0776800 B1 | 11/2007 |
| KR | 10-0801227 B1 | 2/2008 |
| KR | 10-0810500 B1 | 3/2008 |
| KR | 10-2008-0109322 A | 12/2008 |
| KR | 10-2009-0086805 A | 8/2009 |
| KR | 10-0920267 B1 | 10/2009 |
| KR | 10-2010-0119519 A | 11/2010 |
| KR | 10-1032792 B1 | 5/2011 |
| KR | 10-2011-0113414 A | 10/2011 |
| WO | 1995/002221 A1 | 1/1995 |
| WO | 1997/026612 A1 | 7/1997 |
| WO | 1998/041956 A1 | 9/1998 |
| WO | 1999/001834 A1 | 1/1999 |
| WO | 1999/008238 A1 | 2/1999 |
| WO | 1999/056227 A1 | 11/1999 |
| WO | 2000/060435 A2 | 10/2000 |
| WO | 2000/060435 A3 | 4/2001 |
| WO | 2002/073603 A1 | 9/2002 |
| WO | 2006/129967 A1 | 12/2006 |
| WO | 2008/085742 A2 | 7/2008 |

(56) References Cited

FOREIGN PATENT DOCUMENTS

| WO | 2008/109835 A2 | 9/2008 |
|---|---|---|
| WO | 2010/075623 A1 | 7/2010 |
| WO | 2011/088053 A2 | 7/2011 |

OTHER PUBLICATIONS

Hermansky, H., "Recognition of Speech in Additive and Convolutional Noise Based on Rasta Spectral Processing", In proceedings of IEEE International Conference on Acoustics, speech and Signal Processing (ICASSP'93), Apr. 27-30, 1993, pp. II-83-II-86.
Hirschman et al., "Multi-Site Data Collection and Evaluation in Spoken Language Understanding", Proceedings of the workshop on Human Language Technology, 1993, pp. 19-24.
Hobbs et al., "Fastus: A System for Extracting Information from Natural-Language Text", SRI International, Technical Note 519, Nov. 19, 1992, 26 pages.
Hobbs et al., "Fastus: Extracting Information from Natural-Language Texts", SRI International, 1992, pp. 1-22.
Hobbs, Jerry R., "Sublanguage and Knowledge", SRI International, Technical Note 329, Jun. 1984, 30 pages.
Hodjat et al., "Iterative Statistical Language Model Generation for Use with an Agent-Oriented Natural Language Interface", Proceedings of HCI International, vol. 4, Jun. 22-27, 2003, pp. 1422-1426.
Hoehfeld et al., "Learning with Limited Numerical Precision Using the Cascade-Correlation Algorithm", IEEE Transactions on Neural Networks, vol. 3, No. 4, Jul. 1992, 18 pages.
Holmes, J. N., "Speech Synthesis and Recognition-Stochastic Models for Word Recognition", Published by Chapman & Hall, London, ISBN 0 412 534304, 1998, 7 pages.
Hon et al., "CMU Robust Vocabulary-Independent Speech Recognition System", IEEE International Conference on Acoustics, Speech, and Signal Processing (ICASSP-91), Apr. 14-17, 1991, pp. 889-892.
Huang et al., "The SPHINX-II Speech Recognition System: An Overview", Computer, Speech and Language, Jan. 15, 1992, pp. 1-12.
Issar et al., "CMU's Robust Spoken Language Understanding System", Proceedings of Eurospeech, 1993, 4 pages.
Issar, Sunil, "Estimation of Language Models for New Spoken Language Applications", Proceedings of 4th International Conference on Spoken language Processing, Oct. 3-6, 1996, 4 pages.
Jacobs et al., "Scisor: Extracting Information from On-Line News", Communications of the ACM, vol. 33, No. 11, Nov. 1990, pp. 88-97.
Janas, Jurgen M., "The Semantics-Based Natural Language Interface to Relational Databases", Chapter 6, Cooperative Interfaces to Information Systems, 1986, pp. 143-188.
Jelinek, F., "Self-Organized Language Modeling for Speech Recognition,", Readings in Speech Recognition, edited by Alex Waibel and Kai-Fu Lee, Morgan Kaufmann Publishers, Inc., ISBN: 1-55860-124-4, May 15, 1990, 63 pages.
Jennings et al., "A Personal News Service Based on a User Model Neural Network", IEICE Transactions on Information and Systems, vol. E75-D, No. 2, Tokyo, JP, Mar. 1992, pp. 198-209.
Ji et al., "A Method for Chinese Syllables Recognition based upon Sub-syllable Hidden Markov Model", 1994 International Symposium on Speech, Image Processing and Neural Networks, Hong Kong, Apr. 13-16, 1994, pp. 730-733.
Johnson, Julia A., "A Data Management Strategy for Transportable Natural Language Interfaces", Doctoral thesis submitted to the Department of Computer Science, University of British Columbia, Canada, Jun. 1989, 285 pages.
Jones, J., "Speech Recognition for Cyclone", Apple Computer, Inc., E.R.S.Revision 2.9, Sep. 10, 1992, 93 pages.
Julia et al., "http://www.speech.sri.com/demos/atis.html", Proceedings of AAAI, Spring Symposium, 1997, 5 pages.
Julia et al., "Un editeur interactif de tableaux dessines a main levee (An Interactive Editor for Hand-Sketched Tables)", Traitement du Signal, vol. 12, No. 6, 1995, pp. 619-626.

Kahn et al., "CoABS Grid Scalability Experiments", Autonomous Agents and Multi-Agent Systems, vol. 7, 2003, pp. 171-178.
Kamel et al., "A Graph Based Knowledge Retrieval System", IEEE International Conference on Systems, Man and Cybernetics, 1990, pp. 269-275.
Karp, P. D., "A Generic Knowledge-Base Access Protocol", <http://lecture.cs.buu.ac.th/-f50353/Document/gfp.pdf>, May 12, 1994, 66 pages.
Kats et al., "Exploiting Lexical Regularities in Designing Natural Language Systems", In the Proceedings of the 12th International Conference on Computational Linguistics, 1988, pp. 1-22.
Katz et al., "REXTOR: A System for Generating Relations from Natural Language", In Proceedings of the ACL Workshop on Natural Language Processing and Information Retrieval (NLP&IR), Oct. 2000, 11 pages.
Katz, Boris, "A Three-Step Procedure for Language Generation", Massachusetts Institute of Technology, A.I. Memo No. 599, Dec. 1980, pp. 1-40.
Katz, Boris, "Annotating the World Wide Web Using Natural Language", In Proceedings of the 5th RIAO Conference on Computer Assisted Information Searching on the Internet, 1997, 7 pages.
Katz, Boris, "Using English for Indexing and Retrieving", Proceedings of the 1st RIAO Conference on User-Oriented Content-Based Text and Image Handling, 1988, pp. 314-332.
Katz, Slava. M., "Estimation of Probabilities from Sparse Data for the Language Model Component of a Speech Recognizer", IEEE Transactions on Acoustics, Speech, and Signal Processing, vol. ASSP-35, No. 3, Mar. 1987, 3 pages.
Kickstarter, "Ivee Sleek: Wi-Fi Voice-Activated Assistant", available online at <https://www.kickstarter.com/projects/ivee/ivee-sleek-wi-fi-voice-activated-assistant> retrived from internet on Feb. 10, 2014, 13 pages.
Kitano, H., "φDM-Dialog: An Experimental Speech-to-Speech Dialog Translation System", Computer, vol. 24, No. 6, Jun. 1991, 13 pages.
Klabbers et al., "Reducing Audible Spectral Discontinuities", IEEE Transactions on Speech and Audio Processing, vol. 9, No. 1, Jan. 2001, pp. 39-51.
Klatt Dennis H., "Linguistic Uses of Segmental Duration in English: Acoustic and Perpetual Evidence", Journal of the Acoustical Society of America, vol. 59, No. 5, May 1976, pp. 1208-1221.
Knownav, "Knowledge Navigator", YouTube Video available at <http://www.youtube.com/watch?v=QRH8eimU_20>, Apr. 29, 2008, 1 page.
Kominek et al., "Impact of Durational Outlier Removal from Unit Selection Catalogs", 5th ISCA Speech Synthesis Workshop, Jun. 14-16, 2004, 6 pages.
Konolige, Kurt, "A Framework for a Portable Natural-Language Interface to Large Data Bases", SRI International, Technical Note 197, Oct. 12, 1979, 54 pages.
Kubala et al., "Speaker Adaptation from a Speaker-Independent Training Corpus", International Conference on Acoustics, Speech, and Signal Processing (ICASSP'90), Apr. 3-6, 1990, 4 pages.
Kubala et al., "The Hub and Spoke Paradigm for CSR Evaluation", Proceedings of the Spoken Language Technology Workshop, Mar. 6-8, 1994, 9 pages.
Laird et al., "SOAR: An Architecture for General Intelligence", Artificial Intelligence, vol. 33, 1987, pp. 1-64.
Langly et al., "A Design for the ICARUS Architechture", SIGART Bulletin, vol. 2, No. 4, 1991, pp. 104-109.
Larks, "Intelligent Software Agents", Available Online at <http://www.cs.cmu.edu/~softagents/larks.html> retrieved on Mar. 15, 2013, 2006, 2 pages.
Lee et al., "A Real-Time Mandarin Dictation Machine for Chinese Language with Unlimited Texts and Very Large Vocabulary", International Conference on Acoustics, Speech and Signal Processing, vol. 1, Apr. 3-6, 1990, 5 pages.
Lee et al., "Golden Mandarin(II)—An Improved Single-Chip Real-Time Mandarin Dictation Machine for Chinese Language with Very Large Vocabulary", 0-7803-0946-4/93 © 1993 IEEE, 1993, 4 pages.
Lee et al., "Golden Mandarin(II)—An Intelligent Mandarin Dictation Machine for Chinese Character Input with Adaptation/Learning

(56) References Cited

OTHER PUBLICATIONS

Functions", International Symposium on Speech, Image Processing and Neural Networks, Hong Kong, Apr. 13-16, 1994, 5 pages.
Lee et al., "System Description of Golden Mandarin (I) Voice Input for Unlimited Chinese Characters", International Conference on Computer Processing of Chinese & Oriental Languages, vol. 5, Nos. 3 & 4, Nov. 1991, 16 pages.
Lee, K. F., "Large-Vocabulary Speaker-Independent Continuous Speech Recognition: The SPHINX System", Partial Fulfillment of the requirements for the degree of Doctor of Philosophy, Computer Science Department, Carnegie Mellon University, Apr. 18, 1988, 195 pages.
Lemon et al., "Multithreaded Context for Robust Conversational Interfaces: Context-Sensitive Speech Recognition and Interpretation of Corrective Fragments", ACM Transactions on Computer-Human Interaction, vol. 11, No. 3, Sep. 2004, pp. 241-267.
Leong et al., "CASIS: A Context-Aware Speech Interface System", Proceedings of the 10th International Conference on Intelligent user Interfaces, San Diego, California, Jan. 9-12, 2005, pp. 231-238.
Grosz et al., "Research on Natural-Language Processing at SRI", SRI International Technical Note 257, Nov. 1981, 21 pages.
Grosz et al., "TEAM: An Experiment in the Design of Transportable Natural-Language Interfaces", Artificial Intelligence, vol. 32, 1987, pp. 173-243.
Grosz, Barbara J., "Team: A Transportable Natural-Language Interface System", Proceedings of the First Conference on Applied Natural Language Processing, 1983, pp. 39-45.
Gruber et al., "An Ontology for Engineering Mathematics", Fourth International Conference on Principles of Knowledge Representation and Reasoning, Available at <http://www-ksl.stanford.edu/knowledge-sharing/papers/engmath.html>, 1994, pp. 1-22.
Gruber et al., "Generative Design Rationale: Beyond the Record and Replay Paradigm", Knowledge Systems Laboratory, Technical Report KSL 92-59, Dec. 1991, Updated Feb. 1993, 24 pages.
Gruber et al., "Machine-Generated Explanations of Engineering Models: A Compositional Modeling Approach", In Proc. International Joint Conference on Artificial Intelligence, 1993, 7 pages.
Gruber et al., "NIKE: A National Infrastructure for Knowledge Exchange", A Whitepaper Advocating and ATP Initiative on Technologies for Lifelong Learning, Oct. 1994, pp. 1-10.
Gruber et al., "Toward a Knowledge Medium for Collaborative Product Development", Proceedings of the Second International Conference on Artificial Intelligence in Design, Jun. 22-25, 1992, pp. 1-19.
Gruber et al., "A Translation Approach to Portable Ontology Specifications", Knowledge Systems Laboratory, Technical Report KSL 92-71, Sep. 1992, Revised Apr. 1993, 27 pages.
Gruber, Thomas R., "Automated Knowledge Acquisition for Strategic Knowledge", Machine Learning, vol. 4, 1989, pp. 293-336.
Gruber, Thomas R., Interactive Acquisition of Justifications: Learning "Why" by Being Told "What", Knowledge Systems Laboratory, Technical Report KSL 91-17, Original Oct. 1990, Revised Feb. 1991, pp. 1-23.
Gruber, Thomas R., "Toward Principles for the Design of Ontologies Used for Knowledge Sharing", In International Journal Human-Computer Studies, vol. 43, p. 907-928, substantial revision of paper presented at the International Workshop on Formal Ontology, Available as Technical Report KSL 93-04, Knowledge Systems Laboratory, revised Aug. 23, 1993, 23 pages.
Gruber, Tom, "(Avoiding) the Travesty of the Commons", Presentation at NPUC, New Paradigms for User Computing, IBM Almaden Research Center, Jul. 24, 2006, 52 pages.
Gruber, Tom, "2021: Mass Collaboration and the Really New Economy", TNTY Futures, vol. 1, No. 6, Available Online at <http://tomgruber.org/writing/tnty2001.htm>, Aug. 2001, 5 pages.
Gruber, Tom, "Big Think Small Screen: How Semantic Computing in the Cloud will Revolutionize the Consumer Experience on the Phone", Keynote presentation at Web 3.0 conference, 2009, 41 pages.
Gruber, Tom, "Collaborating around Shared Content on the WWW", W3C Workshop on WWW and Collaboration, Available at <http://www.w3.org/Collaboration/Workshop/Proceedings/P9.html>, Sep. 11, 1995, 1 page.
Gruber, Tom, "Collective Knowledge Systems: Where the Social Web meets the Semantic Web", Web Semantics: Science, Services and Agents on the World Wide Web, 2007, pp. 1-19.
Gruber, Tom, "Despite our Best Efforts, Ontologies are not the Problem", AAAI Spring Symposium, Available at <http://tomgruber.org/writing/aaai-ss08.htm>, 2008, pp. 1-40.
Gruber, Tom, "Enterprise Collaboration Management with Intraspect", Intraspect Technical White Paper, Jul. 2001, pp. 1-24.
Gruber, Tom, "Every Ontology is a Treaty—A Social Agreement—Among People with Some Common Motive in Sharing", Official Quarterly Bulletin of AIS Special Interest Group on Semantic Web and Information Systems, vol. 1, No. 3, 2004, pp. 1-5.
Gruber, Tom, "Helping Organizations Collaborate, Communicate, and Learn", Presentation to NASA Ames Research, intraspect, available at <http://tomgruber.org/writing/organizational-intelligence-talk.htm>, Mar.-Oct. 2003, 30 pages.
Gruber, Tom, "Intelligence at the Interface: Semantic Technology and the Consumer Internet Experience", Presentation at Semantic Technologies Conference, Available at <http://tomgruber.org/writing/semtech08.htm>, 2008, pp. 1-40.
Gruber, Tom, "It Is What It Does: The Pragmatics of Ontology for Knowledge Sharing", Proceedings of the International CIDOC CRM Symposium, Available at <http://tomgruber.org/writing/cidoc-ontology.htm>, Mar. 26, 2003, 21 pages.
Gruber, Tom, "Ontologies, Web 2.0 and Beyond", Ontology Summit, available at <http://tomgruber.org/writing/ontolog-social-web-keynote.htm>, Apr. 24, 2007, 17 pages.
Gruber, Tom, "Ontology of Folksonomy: A Mash-up of Apples and Oranges", Int'l Journal on Semantic Web & Information Systems, vol. 3, No. 2, 2007, 7 pages.
Gruber, Tom, "Siri, a Virtual Personal Assistant—Bringing Intelligence to the Interface", Semantic Technologies conference, Jun. 16, 2009, 21 pages.
Gruber, Tom, "TagOntology", Presentation to Tag Camp, Oct. 29, 2005, 20 pages.
Gruber, Tom, "Where the Social Web meets the Semantic Web", Presentation at the 5th International Semantic Web Conference, Nov. 7, 2006, 38 pages.
Guida et al., "NLI: A Robust Interface for Natural Language Person-Machine Communication", Int. J. Man-Machine Studies, vol. 17, 1982, pp. 417-433.
Guzzoni et al., "A Unified Platform for Building Intelligent Web Interaction Assistants", Proceedings of the 2006 IEEE/WIC/ACM International Conference on Web Intelligence and Intelligent Agent Technology, Computer Society, 2006, 4 pages.
Guzzoni et al., "Active, A Platform for Building Intelligent Operating Rooms", Surgetica 2007 Computer-Aided Medical Interventions: tools and Applications, Paris, 2007, Sauramps Medical, http://isro.epfl.ch/page-68384-en.html,, 2007, 8 pages.
Guzzoni et al., "Active, A Platform for Building Intelligent Software,", Computational Intelligence, available online at <http://www.informatik.uni-trier.del-ley/pers/hd/g/Guzzoni:Didier>, 2006, 5 pages.
Guzzoni et al., "Active, A Tool for Building Intelligent User Interfaces", ASC 2007, Palma de Mallorca, <http://isro.epfl.ch/page-34241.html>, 2007, 6 pages.
Guzzoni et al., "Many Robots Make Short Work", AAAI Robot Contest, SRI International, 1996, pp. 1-9.
Guzzoni et al., "Modeling Human-Agent Interaction with Active Ontologies", AAAI Spring Symposium, Interaction Challenges for Intelligent Assistants, Stanford University, Palo Alto, California, 2007, 8 pages.
Guzzoni, D., "Active: A unified platform for building intelligent assistant applications", Oct. 25, 2007, 262 pages.
Haas et al., "An Approach to Acquiring and Applying Knowledge", SRI international Technical Note 227, Nov. 1980, 22 pages.
Hadidi et al., "Students' Acceptance of Web-Based Course Offerings: An Empirical Assessment", Proceedings of the Americas Conference on Information Systems (AMCIS), 1998, 4 pages.

(56) References Cited

OTHER PUBLICATIONS

Hardwar, Devemder, "Driving App Waze Builds its own Siri for Hands-Free Voice Control", retrieved from internet on Feb. 9, 2012 <http ://ventu rebeat. com/20 12/0 2/09/ driving-a pp-waze-bu i lds-its-own-siri-for -hands- freevoice-control/>, 4 pages.

Harris, F. J., "On the Use of Windows for Harmonic Analysis with the Discrete Fourier Transform", In Proceedings of the IEEE, vol. 66, No. 1, Jan. 1978, 34 pages.

Hawkins et al., "Hierarchical Temporal Memory: Concepts, Theory, and Terminology", Numenta, Inc., Mar. 27, 2007, pp. 1-20.

He et al., "Personal Security Agent: KQML-Based PKI", The Robotics Institute, Carnegie-Mellon University, paper, 1997, pp. 1-14.

Helm et al., "Building Visual Language Parsers", In Proceedings of CHI'91 Proceedings of the SIGCHI Conference on Human Factors in Computing Systems, 1991, pp. 105-112.

Hendrix et al., "Developing a Natural Language Interface to Complex Data", ACM Transactions on Database Systems, vol. 3, No. 2, Jun. 1978, pp. 105-147.

Hendrix et al., "Transportable Natural-Language Interfaces to Databases", SRI International, Technical Note 228, Apr. 30, 1981, 18 pages.

Hendrix et al., "Human Engineering for Applied Natural Language Processing", SRI International, Technical Note 139, Feb. 1977, 27 pages.

Hendrix, Gary G., "Klaus: A System for Managing Information and Computational Resources", SRI International, Technical Note 230, Oct. 1980, 34 pages.

Hendrix, Gary G., "Lifer: A Natural Language Interface Facility", SRI Stanford Research Institute, Technical Note 135, Dec. 1976, 9 pages.

Hendrix, Gary G., "Natural-Language Interface", American Journal of Computational Linguistics, vol. 8, No. 2, Apr.-Jun. 1982, pp. 56-61.

Hendrix, Gary G., "The Lifer Manual: A Guide to Building Practical Natural Language Interfaces", SRI International, Technical Note 138, Feb. 1977, 76 pages.

Bahl et al., "Multonic Markov Word Models for Large Vocabulary Continuous Speech Recognition", IEEE Transactions on Speech and Audio Processing, vol. 1, No. 3, Jul. 1993, 11 pages.

Bahl et al., "Speech Recognition with Continuous-Parameter Hidden Markov Models", In Proceeding of International Conference on Acoustics, Speech, and Signal Processing (ICASSP'88), vol. 1, Apr. 11-14, 1988, 8 pages.

Banbrook, M., "Nonlinear Analysis of Speech from a Synthesis Perspective", A Thesis Submitted for the Degree of Doctor of Philosophy, The University of Edinburgh, Oct. 15, 1996, 35 pages.

Bear et al., "A System for Labeling Self-Repairs in Speech", SRI International, Technical Note 522, Feb. 22, 1993, pp. 1-8.

Bear et al., "Detection and Correction of Repairs in Human-Computer Dialog", SRI International, Technical Note 518, May 5, 1992, pp. 1-10.

Bear et al., "Integrating Multiple Knowledge Sources for Detection and Correction of Repairs in Human-Computer Dialog", Proceedings of the 30th annual meeting on Association for Computational Linguistics (ACL), 1992, 8 pages.

Bear et al., "Using Information Extraction to Improve Document Retrieval", SRI International, Jan. 9, 1998, pp. 1-11.

Belaid et al., "A Syntactic Approach for Handwritten Mathematical Formula Recognition", IEEE Transactions on Pattern Analysis and Machine Intelligence, vol. PAMI-6, No. 1, Jan. 1984, 7 pages.

Bellegarda et al., "A Latent Semantic Analysis Framework for Large-Span Language Modeling", 5th European Conference on Speech, Communication and Technology, (EUROSPEECH'97), Sep. 22-25, 1997, 4 pages.

Bellegarda et al., "A Multispan Language Modeling Framework for Large Vocabulary Speech Recognition", IEEE Transactions on Speech and Audio Processing vol. 6, No. 5, Sep. 1998, 12 pages.

Bellegarda et al., "A Novel Word Clustering Algorithm Based on Latent Semantic Analysis", In Proceedings of the IEEE International Conference on Acoustics, Speech, and Signal Processing (ICASSP'96}, vol. 1, 1996, 4 pages.

Bellegarda et al., "Experiments Using Data Augmentation for Speaker Adaptation", International Conference on Acoustics, Speech, and Signal Processing (ICASSP'95), May 9-12, 1995, 4 pages.

Bellegarda et al., "On-Line Handwriting Recognition Using Statistical Mixtures", Advances in Handwriting and Drawings: A Multidisciplinary Approach, Europia, 6th International IGS Conference on Handwriting and Drawing, Paris-France, Jul. 1993, 11 pages.

Bellegarda et al., "Performance of the IBM Large Vocabulary Continuous Speech Recognition System on the ARPA Wall Street Journal Task", Signal Processing VII: Theories and Applications, © 1994 European Association for Signal Processing, 1994, 4 pages.

Bellegarda et al., "The Metamorphic Algorithm: A Speaker Mapping Approach to Data Augmentation", IEEE Transactions on Speech and Audio Processing, vol. 2, No. 3, Jul. 1994, 8 pages.

Bellegarda, J. R., "Exploiting Both Local and Global Constraints for Multi-Span Statistical Language Modeling", Proceeding of the 1998 IEEE International Conference on Acoustics, Speech, and Signal Processing (1CASSP'98), vol. 2, May 12-15, 1998, 5 pages.

Bellegarda, J. R., "Exploiting Latent Semantic Information in Statistical Language Modeling", Proceedings of the IEEE, vol. 88, No. 8, Aug. 2000, 18 pages.

Bellegarda, J. R., "Interaction-Driven Speech Input—A Data-Driven Approach to the Capture of Both Local and Global Language Constraints", available online at <http:// old.sig.chi.ora/bulletin/1998.2/bellegarda.html>, 1992, 7 pages.

Bellegarda, J. R., "Large Vocabulary Speech Recognition with Multispan Statistical Language Models", IEEE Transactions on Speech and Audio Processing, vol. 8, No. 1, Jan. 2000, 9 pages.

Belvin et al., "Development of the HRL Route Navigation Dialogue System", In Proceedings of the First International Conference on Human Language Technology Research, Paper, 2001, 5 pages.

Berry et al., "PTIME: Personalized Assistance for Calendaring", ACM Transactions on Intelligent Systems and Technology, vol. 2, No. 4, Article 40, Jul. 2011, pp. 1-22.

Berry et al., "Task Management under Change and Uncertainty Constraint Solving Experience with the CALO Project", Proceedings of CP'05 Workshop on Constraint Solving under Change, 2005, 5 pages.

Black et al., "Automatically Clustering Similar Units for Unit Selection in Speech Synthesis", In Proceedings of Eurospeech 1997, vol. 2, 1997, 4 pages.

Blair et al., "An Evaluation of Retrieval Effectiveness for a Full-Text Document-Retrieval System", Communications of the ACM, vol. 28, No. 3, Mar. 1985, 11 pages.

Bobrow et al., "Knowledge Representation for Syntactic/Semantic Processing", AAA-80 Proceedings, 1980, pp. 316-323.

Bouchou et al., "Using Transducers in Natural Language Database Query", Proceedings of 4th International Conference on Applications of Natural Language to Information Systems, Austria, Jun. 17-19, 1999, 17 pages.

Bratt et al., "The SRI Telephone-based ATIS System", Proceedings of ARPA Workshop on Spoken Language Technology, 1995, 3 pages.

Briner, L. L., "Identifying Keywords in Text Data Processing", In Zelkowitz, Marvin V., ED, Directions and Challenges, 15th Annual Technical Symposium, Gaithersbury, Maryland, Jun. 17, 1976, 7 pages.

Bulyko et al., "Joint Prosody Prediction and Unit Selection for Concatenative Speech Synthesis", Electrical Engineering Department, University of Washington, Seattle, 2001, 4 pages.

Burke et al., "Question Answering from Frequently Asked Question Files", AI Magazine, Spring, vol. 18, No. 2, 1997, pp. 57-66.

Burns et al., "Development of a Web-Based Intelligent Agent for the Fashion Selection and Purchasing Process via Electronic Commerce", Proceedings of the Americas Conference on Information system (AMCIS), Dec. 31, 1998, pp. 140-142.

Bussey et al., "Service Architecture, Prototype Description, and Network Implications of a Personalized Information Grazing Service", INFOCOM'90, Ninth Annual Joint Conference of the IEEE Computer and Communication Societies, available online at <http://slrohall.com/oublications/>, Jun. 3-7, 1990, 8 pages.

(56) References Cited

OTHER PUBLICATIONS

Bussler et al., "Web Service Execution Environment (WSMX)", available online at <http://www.w3.org/Submission/WSMX/>, retrieved from internet on Sep. 17, 2012, 29 pages.
Butcher, Mike, "EVI Arrives in Town to go Toe-to-Toe with Siri", TechCrunch, Jan. 23, 2012, 2 pages.
Buzo et al., "Speech Coding Based Upon Vector Quantization", IEEE Transactions on Acoustics, Speech, and Signal Processing, vol. ASSP-28, No. 5, Oct. 1980, 13 pages.
Caminero-Gil et al., "Data-Driven Discourse Modeling for Semantic Interpretation", In Proceedings of the IEEE International Conference on Acoustics, Speech, and Signal Processing, May 7-10, 1996, 6 pages.
Carter et al., "The Speech-Language Interface in the Spoken Language Translator", SRI International, Nov. 23, 1994, pp. 1-9.
Carter, David M., "Lexical Acquisition in the Core Language Engine", Proceedings of the Fourth Conference of the European Chapter of the Association for Computational Linguistics, 1989, pp. 137-144.
Cawley, "The Application of Neural Networks to Phonetic Modelling", PhD Thesis, University of Essex, Mar. 1996, 13 pages.
Chai et al., "Comparative Evaluation of a Natural Language Dialog Based System and a Menu Driven System for Information Access: a Case Study", Proceedings of the International Conference on Multimedia Information Retrieval (RIAO), Apr. 2000, 11 pages.
Chang et al., "A Segment-based Speech Recognition System for Isolated Mandarin Syllables", Proceedings TEN CON '93, IEEE Region 10 conference on Computer, Communication, Control and Power Engineering, vol. 3, Oct. 19-21, 1993, pp. 317-320.
Chen, Yi, "Multimedia Siri Finds and Plays Whatever You Ask for", PSFK Report, Feb. 9, 2012, 9 pages.
Cheyer et al., "Demonstration Video of Multimodal Maps Using an Agent Architecture", available online at <http://www.youtube.com/watch?v=x3TptMGT9EQ&feature=youtu.be>, published on 1996, 6 pages.
Cheyer et al., "Demonstration Video of Multimodal Maps Using an Open-Agent Architecture", available online at <http://www.youtube.com/watch?v=JUxaKnyZyM&feature=youtu.be>, published on 1996, 6 pages.
Cheyer et al., "Multimodal Maps: An Agent-based Approach", International Conference on Cooperative Multimodal Communication, Jun. 9, 1995, pp. 1-15.
Cheyer et al., "Spoken Language and Multimodal Applications for Electronic Realties", Virtual Reality, vol. 3, 1999, pp. 1-15.
Cheyer et al., "The Open Agent Architecture,", Autonomous Agents and Multi-Agent systems, vol. 4, Mar. 1, 2001, 6 pages.
Cheyer et al., "The Open Agent Architecture: Building Communities of Distributed Software Agents", Artificial Intelligence Center SRI International, Power Point presentation, available online at <http://www.ai.sri.com/~oaa>, Feb. 21, 1998, 25 pages.
Cheyer, A., "Demonstration Video of Vanguard Mobile Portal", available online at <http://www.youtube.com/watch?v=ZTMsvg_0oLQ&feature=youtu.be>, published on 2004, 10 pages.
Cheyer, Adam, "A Perspective on AI & Agent Technologies for SCM", VerticaiNet presentation, 2001, 22 pages.
Owei et al., "Natural Language Query Filtration in the Conceptual Query Language", IEEE, 1997, pp. 539-549.
Pannu et al., "A Learning Personal Agent for Text Filtering and Notification", Proceedings of the International Conference of Knowledge Based Systems, 1996, pp. 1-11.
Papadimitriou et al., "Latent Semantic Indexing: A Probabilistic Analysis", available online at <http://citeseerx.ist.psu.edu/messaqes/downloadsexceeded.html>, Nov. 14, 1997, 21 pages.
Parsons, T. W., "Voice and Speech Processing", Pitch and Formant Estimation © 1987, McGraw-Hill, Inc., ISBN: 0-07-0485541-0, 1987, 15 pages.
Parsons T. W., "Voice and Speech Processin", Linguistics and Technical Fundamentals, Articulatory Phonetics and Phonemics, © 1987 McGraw-Hill, Inc., ISBN: 0-07-0485541-0, 5 pages.

International Preliminary Report on Patentability received for PCT Patent Application No. PCT/US1993/012637, dated Apr. 10, 1995, 7 pages.
International Preliminary Report on Patentability received for PCT Patent Application No. PCT/US1993/012666, dated Mar. 1, 1995, 5 pages.
International Search Report received for PCT Patent Application No. PCT/US1993/012666, dated Nov. 9, 1994, 8 pages.
International Preliminary Report on Patentability received for PCT Patent Application No. PCT/US1994/011011, dated Feb. 28, 1996, 4 pages.
International Search Report received for PCT Patent Application No. PCT/US1994/011011, dated Feb. 8, 1995, 7 pages.
Written Opinion received for PCT Patent Application No. PCT/US1994/011011, dated Aug. 21, 1995, 4 pages.
International Preliminary Report on Patentability received for PCT Patent Application No. PCT/US1995/008369, dated Oct. 9, 1996, 4 pages.
International Search Report received for PCT Patent Application No. PCT/US1995/008369, dated Nov. 8, 1995, 6 pages.
International Search Report and Written Opinion received for PCT Patent Application No. PCT/US2011/020861, dated Nov. 29, 2011, 12 pages.
International Preliminary Report on Patentability received for PCT Patent Application No. PCT/US2012/029810, dated Oct. 3, 2013, 9 pages.
International Search Report and Written Opinion received for PCT Patent Application No. PCT/US2012/029810, dated Aug. 17, 2012, 11 pages.
Pereira, Fernando, "Logic for Natural Language Analysis", SRI International, Technical Note 275, Jan. 1983, 194 pages.
Perrault et al., "Natural-Language Interfaces", SRI International, Technical Note 393, Aug. 22, 1986, 48 pages.
Phoenix Solutions, Inc., A, "Declaration of Christopher Schmandt Regarding the MIT Galaxy System", West Interactive Corporation, a Delaware Corporation, Document 40, Jul. 2, 2010, 162 pages.
Picone, J., "Continuous Speech Recognition Using Hidden Markov Models", IEEE ASSP Magazine, vol. 7, No. 3, Jul. 1990, 16 pages.
Pulman et al., "Clare: A Combined Language and Reasoning Engine", Proceedings of JFIT Conference, available online at <URL: http://www.cam.sri.com/tr/crc042/paper.ps.Z>, 1993, 8 pages.
Rabiner et al., "Fundamental of Speech Recognition", © 1993 AT&T, Published by Prentice-Hall, Inc., ISBN: 0-13-285826-6, 1993, 17 pages.
Rabiner et al., "Note on the Properties of a Vector Quantizer for LPC Coefficients", Bell System Technical Journal, vol. 62, No. 8, Oct. 1983, 9 pages.
Ratcliffe, M., "ClearAccess 2.0 allows SQL searches off-line (Structured Query Language)", ClearAcess Corp., MacWeek, vol. 6, No. 41, Nov. 16, 1992, 2 pages.
Ravishankar, "Efficient Algorithms for Speech Recognition", Doctoral Thesis submitted to School of Computer Science, Computer Science Division, Carnegie Mellon University, Pittsburg, May 15, 1996, 146 pages.
Rayner et al., "Adapting the Core Language Engine to French and Spanish", Cornell University Library, available online at <http://arxiv.org/abs/cmp-Ig/9605015.>, May 10, 1996, 9 pages.
Rayner et al., "Deriving Database Queries from Logical Forms by Abductive Definition Expansion", Proceedings of the Third Conference on Applied Natural Language Processing, ANLC, 1992, 8 pages.
Rayner et al., "Spoken Language Translation With Mid-90's Technology: A Case Study", Eurospeech, ISCA, available online at <http:// db I p. u n i-trier. de/d b/conf/interspeech/eurospeech 1993.html#RaynerBCCDGKKLPPS93>, 1993, 4 pages.
Rayner, M., "Abductive Equivalential Translation and its application to Natural Language Database Interfacing", Dissertation paper, SRI International, Sep. 1993, 163 pages.
Rayner, M., "Linguistic Domain Theories: Natural-Language Database Interfacing from First Principles", SRI International, Cambridge, 1993, 11 pages.

(56) References Cited

OTHER PUBLICATIONS

Remde et al., "SuperBook: An Automatic Tool for Information Exploration-Hypertext?", In Proceedings of Hypertext '87, Nov. 13-15, 1987, 14 pages.
Reynolds, C. F., "On-Line Reviews: A New Application of the HICOM Conferencing System", IEE Colloquium on Human Factors in Electronic Mail and Conferencing Systems, Feb. 3, 1989, 4 pages.
Rice et al., "Monthly Program: Nov. 14, 1995", The San Francisco Bay Area Chapter of ACM SIGCHI, Available at <http://www.baychi.org/calendar/19951114>, Nov. 14, 1995, 2 pages.
Rice et al., "Using the Web Instead of a Window System", Proceedings of the SIGCHI Conference on Human Factors in Computing Systems, CHI'96, 1996, pp. 1-14.
Rigoll, G., "Speaker Adaptation for Large Vocabulary Speech Recognition Systems Using Speaker Markov Models", International Conference on Acoustics, Speech, and Signal Processing (ICASSP'89), May 23-26, 1989, 4 pages.
Riley, M D., "Tree-Based Modelling of Segmental Durations", Talking Machines Theories, Models, and Designs, 1992 © Elsevier Science Publishers B.V., North-Holland, ISBN: 08-444-89115.3, 1992, 15 pages.
Rivlin et al., "Maestro: Conductor of Multimedia Analysis Technologies", SRI International, 1999, 7 pages.
Rivoira et al., "Syntax and Semantics in a Word-Sequence Recognition System", IEEE International Conference on Acoustics, Speech, and Signal Processing (ICASSP'79), Apr. 1979, 5 pages.
Roddy et al., "Communication and Collaboration in a Landscape of B2B eMarketplaces", VerticaiNet Solutions, white paper, Jun. 15, 2000, 23 pages.
Rosenfeld, R., "A Maximum Entropy Approach to Adaptive Statistical Language Modelling", Computer Speech and Language, vol. 10, No. 3, Jul. 1996, 25 pages.
Roszkiewicz, A., "Extending your Apple", Back Talk—Lip Service, A+ Magazine, The Independent Guide for Apple Computing, vol. 2, No. 2, Feb. 1984, 5 pages.
Rudnicky et al., "Creating Natural Dialogs in the Carnegie Mellon Communicator System", Proceedings of Eurospeech, vol. 4, 1999, pp. 1531-1534.
Russell et al., "Artificial Intelligence, A Modern Approac", © 1995 Prentice Hall, Inc., 1995, 121 pages.
Sacerdoti et al., "A Ladder User's Guide (Revised)", SRI International Artificial Intelligence Center, Mar. 1980, 39 pages.
Sagalowicz, D., "AD-Ladder User's Guide", SRI International, Sep. 1980, 42 pages.
Sakoe et al., "Dynamic Programming Algorithm Optimization for Spoken Word Recognition", IEEE Transactions on Acoustics, Speech, and Signal Processing, vol. ASSP-26 No. 1, Feb. 1978, 8 pages.
Salton et al., "On the Application of Syntactic Methodologies in Automatic Text Analysis", Information Processing and Management, vol. 26, No. 1, Great Britain, 1990, 22 pages.
Sameshima et al., "Authorization with security attributes and privilege delegation Access control beyond the ACL", Computer Communications, vol. 20, 1997, 9 pages.
San-Segundo et al., "Confidence Measures for Dialogue Management in the CU Communicator System", Proceedings of Acoustics, Speech, and Signal Processing (ICASSP'00), Jun. 5-9, 2000, 4 pages.
Sato, H., "A Data Model, Knowledge Base, and Natural Language Processing for Sharing a Large Statistical Database,", Statistical and Scientific Database Management, Lecture Notes in Computer Science, vol. 339, 1989, 20 pages.
Savoy, J., "Searching Information in Hypertext Systems Using Multiple Sources of Evidence", International Journal of Man-Machine Studies, vol. 38, No. 6, Jun. 1996, pp. 1017-1030.
Scagliola, C., "Language Models and Search Algorithms for Real-Time Speech Recognition", International Journal of Man-Machine Studies, vol. 22, No. 5, 1985, pp. 523-547.

Schmandt et al., "Augmenting a Window System with Speech Input", IEEE Computer Society, Computer, vol. 23, No. 8, Aug. 1990, pp. 50-56.
Ward et al., "A Class Based Language Model for Speech Recognition", Conference Proceedings International Conference on Acoustics, Speech, and Signal Processing, 1996, ICASSP-96 , pp. 416-418.
Schütze, H., "Dimensions of Meaning", Proceedings of Supercomputing'92 Conference, Nov. 16-20, 1992, 10 pages.
Seneff et al., "A New Restaurant Guide Conversational System: Issues in Rapid Prototyping for Specialized Domains", Proceedings of Fourth International Conference on Spoken Language, 1996. ICSLP 96, 1996, pp. 665-668.
Sharoff et al., "Register-domain Separation as a Methodology for Development of Natural Language Interfaces to Databases", Proceedings of Human-Computer Interaction (INTERACT'99), 1999, 7 pages.
Sheth et al., "Evolving Agents for Personalized Information Filtering", In Proceedings of the Ninth Conference on Artificial Intelligence for Applications, Mar. 1-5, 1993, 9 pages.
Sheth et al., "Relationships at the Heart of Semantic Web: Modeling, Discovering, and Exploiting Complex Semantic Relationships", Enhancing the Power of the Internet: Studies in Fuzziness and Soft Computing, Oct. 13, 2002, pp. 1-38.
Shikano et al., "Speaker Adaptation Through Vector Quantization", IEEE International Conference on Acoustics, Speech, and Signal Processing (ICASSP'86), vol. 11, Apr. 1986, 4 pages.
Shimazu et al., "CAPIT: Natural Language Interface Design Tool with Keyword Analyzer and Case-Based Parser,", NEG Research & Development, vol. 33, No. 4, Oct. 1992, 11 pages.
Shinkle, L., "Team User's Guide", SRI International, Artificial Intelligence Center, Nov. 1984, 78 pages.
Shklar et al., "Info Harness: Use of Automatically Generated Metadata for Search and Retrieval of Heterogeneous Information", 1995 Proceedings of CAiSE'95, Finland, 1995.
Sigurdsson et al., "Mel Frequency Cepstral Coefficients: An Evaluation of Robustness of MP3 Encoded Music", In Proceedings of the 7th International Conference on Music Information Retrieval ISMIR, 2006, 4 pages.
Silverman et al., "Using a Sigmoid Transformation for Improved Modeling of Phoneme Duration", Proceedings of the IEEE International Conference on Acoustics, Speech, and Signal Processing, Mar. 15-19, 1999, 5 pages.
Simonite, Tom, "One Easy Way to Make Siri Smarter", Technology Review, Oct. 18, 2011, 2 pages.
Singh, N., "Unifying Heterogeneous Information Models", Communications of the ACM, 1998, 13 pages.
SRI International, "The Open Agent Architecture.TM. 1.0 Distribution", Open Agent Architecture (OAA), 1999, 2 pages.
SRI2009, "SRI Speech: Products: Software Development Kits: EduSpeak", available a <http://web.archive.org/web/20090828084033/http://www.speechatsri.com/products/eduspeak> shtml., 2009, 2 pages.
Starr et al., "Knowledge-Intensive Query Processing", Proceedings of the 5th KRDB Workshop, Seattle, May 31, 1998, 6 pages.
Stent et al., "The CommandTalk Spoken Dialogue System", SRI International, 1999, pp. 183-190.
Stern et al., "Multiple Approaches to Robust Speech Recognition", Proceedings of Speech and Natural Language Workshop, 1992, 6 pages.
Stickel, "A Nonclausal Connection-Graph Resolution Theorem-Proving Program", Proceedings of AAAI'82, 1982, pp. 1-13.
Sugumaran, V., "A Distributed Intelligent Agent-Based Spatial Decision Support System", Proceedings of the Americas Conference on Information systems (AMCIS), Dec. 31, 1998, 4 pages.
Sycara et al., "Coordination of Multiple Intelligent Software Agents", International Journal of Cooperative Information Systems (IJCIS), vol. 5, No. 2 & 3, Jun. & Sep. 1996, 33 pages.
Sycara et al., "Distributed Intelligent Agents", IEEE Expert, vol. 11, No. 6, Dec. 1996, 32 pages.
Sycara et al., "Dynamic Service Matchmaking Among Agents in Open Information Environments", SIGMOD Record, 1999, 7 pages.
Sycara et al., "The RETSINA MAS Infrastructure", Autonomous Agents and Multi-Agent Systems, vol. 7, 2003, 20 pages.

(56) References Cited

OTHER PUBLICATIONS

Tenenbaum et al., "Data Structure Using Pascal", 1981 Prentice-Hall, Inc, 1981, 34 pages.
Textndrive, "Text'nDrive App Demo—Listen and Reply to your Messages by Voice while Driving!", YouTube Video available at <http://www.youtube.com/watch?v=WaGfzoHsAMw>, Apr. 27, 2010, 1 page.
Tofel et al., "SpeakTolt: A Personal Assistant for Older iPhones, iPads", Apple News, Tips and Reviews, Feb. 9, 2012, 7 pages.
Tsai et al., "Attributed Grammar—A Tool for Combining Syntactic and Statistical Approaches to Pattern Recognition", IEEE Transactions on Systems, Man, and Cybernetics, vol. SMC-10, No. 12, Dec. 1980, 13 pages.
Tucker, Joshua, "Too Lazy to Grab Your TV Remote? Use Siri Instead", Engadget, Nov. 30, 2011, 8 pages.
Tur et al., "The CALO Meeting Assistant System", IEEE Transactions on Audio, Speech, and Language Processing, vol. 18, No. 6, Aug. 2010, pp. 1601-1611.
Tur et al., "The CALO Meeting Speech Recognition and Understanding System", Proc. IEEE Spoken Language Technology Workshop, 2008, 4 pages.
Tyson et al., "Domain-Independent Task Specification in the TACITUS Natural Language System", SRI International, Artificial Intelligence Center, May 1990, 16 pages.
Udell, J., "Computer Telephony", BYTE, vol. 19, No. 7, Jul. 1, 1994, 9 pages.
Van Santen, J. P., "Contextual Effects on Vowel Duration", Journal Speech Communication, vol. 11, No. 6, Dec. 1992, 34 pages.
Vepa et al., "New Objective Distance Measures for Spectral Discontinuities in Concatenative Speech Synthesis", In Proceedings of the IEEE 2002 Workshop on Speech Synthesis, 2002, 4 pages.
Verschelde, J., "MATLAB Lecture 8. Special Matrices in MATLAB,", UIC Dept. of Math., Stat. & C.S., MCS 320, Introduction to Symbolic Computation, Nov. 23, 2005, 4 pages.
Vingron, M., "Near-Optimal Sequence Alignment", Deutsches Krebsforschungszentrum (DKFZ), Abteilung Theoretische Bioinformatik, Heidelberg, Germany, Jun. 1996, 20 pages.
Vlingo, "Vlingo Launches Voice Enablement Application on Apple App Store", Press Release, Dec. 3, 2008, 2 pages.
Vlingo Lncar, "Distracted Driving Solution with Vlingo InCar", YouTube by Vlingo Voice on (Oct. 6, 2010) 2:38 minute video uploaded to Retrieved from Internet on Jun. 6, 2012<http://www.youtube.com/watch?v=Vqs8XfXxgz4?, 2 pages.
Voiceassist, Send Text, Listen to and Send E~Mail "by Voice", YouTube Video available at <http://www.youtube.com/watch?v=0tEU61nHHA4>, Jul. 30, 2009, 1 page.
Voiceonthego, "Voice on the Go (BlackBerry)", YouTube available at <http://www.youtube.com/watch?v=pJqpWgQS98w>, Jul. 27, 2009, 1 page.
Wahlster et al., "Smartkom: Multimodal Communication with a Life-Like Character,", EUROSPEECH—Scandinavia, 7th European Conference on Speech Communication and Technology, 2001, 5 pages.
Waldinger et al., "Deductive Question Answering from Multiple Resources", New Directions in Question Answering, published by AAAI, Menlo Park, 2003, 22 pages.
Walker et al., "Natural Language Access to Medical Text", SRI International, Artificial Intelligence Center, Mar. 1981, 23 pages.
Waltz, D., "An English Language Question Answering System for a Large Relational Database", © 1978 ACM, vol. 21, No. 7, 1978, 14 pages.
Lieberman et al., "Out of Context: Computer Systems that Adapt to, and Learn from, Context", IBM Systems Journal vol. 39, No. 3&4, 2000, pp. 617-632.
Lin et al., "A Distributed Architecture for Cooperative Spoken Dialogue Agents with Coherent Dialogue State and History", <http://citeseerx.ist.psu.edu/viewdoc/summary?doi=1 0.1.1.42.272>, 1999, 4 pages.
Lin et al., "A New Framework for Recognition of Mandarin Syllables With Tones Using Sub-syllabic Units", IEEE International Conference on Acoustics, Speech, and Signal Processing (ICASSP-93), Apr. 27-30, 1993, pp. 227-230.
Linde, "An Algorithm for Vector Quantizer Design", IEEE Transactions on Communications, vol. 28, No. 1, Jan. 1980, pp. 84-95.
Liu et al., "Efficient Joint Compensation of Speech for the Effects of Additive Noise and Linear Filtering", IEEE International Conference of Acoustics, Speech, and Signal Processing,ICASSP-92, Mar. 23-26, 1992, pp. 257-260.
Lntraspect Software, "The Intraspect Knowledge Management Solution: Technical Overview", <http://tomgruber.org/writing/intraspect-whitepaper-1998.pdf>, 1998, 18 pages.
Logan et al., "Mel Frequency Cepstral Coefficients for Music Modeling", In International Symposium on Music Information Retrieval, 2000, 2 pages.
Lowegian International, "FIR Filter Properties", dspGuro, Digital Signal Processing Central, available online at <httJ;>://www.dspQuru.com/dso/taas/fir/orooerties, > retrived from Internet on Jul. 28, 2010, 6 pages.
Lowerre, B. T., "The-HARPY Speech Recognition System", Doctoral Dissertation, Department of Computer Science, Carnegie Mellon University, Apr. 1976, 20 pages.
Maghbouleh, A., "An Empirical Comparison of Automatic Decision Tree and Linear Regression Models for Vowel Durations", Revised Version of a Paper Presented at the Computational Phonology in Speech Technology workshop, 1996 annual meeting of the Association for Computational Linguistics in Santa Cruz, California, 7 pages.
Markel et al., "Linear Prediction of Speech", Springer-Verlag, Berlin Heidelberg New York, 1976, 12 pages.
Martin et al., "The Open Agent Architecture: A Framework for Building Distributed Software Systems", Applied Artificial Intelligence: An International Journal, vol. 13, No. 1-2, pp. 1-38.
Martin et al., "Building and Using Practical Agent Applications", SRI International, PAAM Tutorial, 1998, pp. 1-26.
Martin et al., "Building Distributed Software Systems with the Open Agent Architecture", Proceedings of the Third International Conference on the Practical Application of Intelligent Agents and Multi-Agent Technology, Mar. 23-25, 1998, pp. 355-376.
Martin et al., "Development Tools for the Open Agent Architecture", Proceedings of the International Conference on the Practical Application of Intelligent Agents and Multi-Agent Technology, Apr. 1996, pp. 1-17.
Martin et al., "Information Brokering in an Agent Architecture", Proceedings of the second International Conference on the Practical Application of Intelligent Agents and Multi-Agent Technology, Apr. 1997, pp. 1-20.
Martin et al., "Transportability and Generality in a Natural-Language Interface System", Proceedings of the Eight International Joint Conference on Artificial Intelligence, Technical Note 293, Aug. 8-12, 1983, 21 pages.
Matiasek et al., "Tamic-P: A System for NL Access to Social Insurance Database", 4th International Conference on Applications of Natural Language to Information Systems, Jun. 17-19, 1999, 7 pages.
McGuire et al., "SHADE: Technology for Knowedge-Based Collaborative Engineering", Journal of Concurrent Engineering~r Applications and Research (CERA), 1993, 18 pages.
Meng et al., "Wheels: A Conversational System in the Automobile Classified Domain", Proceedings Fourth International Conference on Spoken Language, 1996, ICSLP 96, Oct. 1996, pp. 542-545.
Michos et al., "Towards an Adaptive Natural Language Interface to Command Languages", Natural Language Engineering, vol. 2, No. 3, 1996, pp. 191-209.
Milstead et al., "Metadata: Cataloging by Any Other Name", Online, Information Today. Inc., Jan. 1999, 18 pages.
Milward et al., "D2.2: Dynamic MultimodalInterface Reconfiguration" Talk and Look: Tools for Ambient Linguistic Knowledge, IST-507802 Deliverable D2.2, Aug. 8, 2006, 69 pages.
Minker et al., "Hidden Understanding Models for Machine Translation", Proceedings of ETRW on Interactive Dialogue in Multi-Modal Systems, Jun. 1999, pp. 1-4.

(56) References Cited

OTHER PUBLICATIONS

Mitra et al., "A Graph-Oriented Model for Articulation of Ontology Interdependencies", Lecture Notes in Computer Science, vol. 1777, 2000, pp. 86-100.
Modi et al., "CMRadar: A Personal Assistant Agent for Calendar Management", AAAI, Intelligent Systems Demonstrations, 2004, pp. 1020-1021.
Moore et al., "Combining Linguistic and Statistical Knowledge Sources in Natural-Language Processing for ATIS", SRI International, ArtificialIntelliqence Center, 1995, 4 pages.
Moore et al., "SRI's Experience with the ATIS Evaluation", Proceedings of the workshop on Speech and Natural Language, Jun. 24-27, 1990, pp. 147-148.
Moore et al., "The Information Warefare Advisor: An Architecture for Interacting with Intelligent Agents Across the Web", Proceedings of Americas Conference on Information Systems (AMCIS), Dec. 31, 1998, pp. 186-188.
Moore, Robert C., "Handling Complex Queries in a Distributed Data Base", SRI International, Technical Note 170, Oct. 8, 1979, 38 pages.
Moore, Robert C., "Practical Natural-Language Processing by Computer", SRI International, Technical Note 251, Oct. 1981, 34 pages.
Moore, Robert C., "The Role of Logic in Knowledge Representation and Commonsense Reasoning", SRI International, Technical Note 264, Jun. 1982, 19 pages.
Moore, Robert C., "Using Natural-Language Knowledge Sources in Speech Recognition", SRI International, Artificial Intelligence Center, Jan. 1999, pp. 1-24.
Moran et al., "Intelligent Agent-based User Interfaces", Proceedings of International Workshop on Human Interface Technology, Oct. 12-13, 1995, pp. 1-4.
Moran et al., "Multimodal User Interfaces in the Open Agent Architecture", International Conference on Intelligent User Interfaces (IUI97), 1997, 8 pages.
Moran, Douglas B., "Quantifier Soaping in the SRI Core Language Engine", Proceedings of the 26th Annual Meeting on Association for Computational Linguistics, 1988, pp. 33-40.
Morgan, B., "Business Objects (Business Objects for Windows) Business Objects Inc.", DBMS, vol. 5, No. 10, Sep. 1992, 3 pages.
Motro, Amihal "Flex: A Tolerant and Cooperative User Interface to Databases", IEEE Transactions on Knowledge and Data Engineering, vol. 2, No. 2, Jun. 1990, pp. 231-246.
Mountford et al., "Talking and Listening to Computers", The Art of Human-Computer Interface Design, Copyright © 1990 Apple Computer, Inc. Addison-Wesley Publishing Company, Inc, 1990, 17 pages.
Mozer, Michael C., "An Intelligent Environment Must be Adaptive", IEEE Intelligent Systems, Mar./Apr. 1999, pp. 11-13.
Muhlhauser, Max, "Context Aware Voice User Interfaces for Workflow Support", 2007, 254 pages.
Murty, "Combining Evidence from Residual Phase and MFCC Features for Speaker Recognition", IEEE Signal Processing Letters, vol. 13, No. 1, Jan. 2006, pp. 52-55.
Murveit et al., "Integrating Natural Language Constraints into HMM-based Speech Recognition", 1990 International Conference on Acoustics, Speech, and Signal Processing, Apr. 3-6, 1990, 5 pages.
Murveit et al., "Speech Recognition in SRI's Resource Management and ATIS Systems", Proceedings of the Workshop on Speech and Natural Language, 1991, pp. 94-100.
Nakagawa et al., "Speaker Recognition by Combining MFCC and Phase Information", IEEE International Conference on Acoustics Speech and Signal Processing ICASSP, Mar. 14-19, 2010, pp. 4502-4505.
Naone, Erica, "TR10: Intelligent Software Assistant", Technology Review, Mar.-Apr. 2009, 2 pages.
Neches et al., "Enabling Technology for Knowledge Sharing", Fall, 1991, pp. 37-56.

Niesler et al., "A Variable-Length Category-Based N-Gram Language Model", IEEE International Conference on Acoustics, Speech, and Signal Processing (ICASSP'96), vol. 1, May 7-10, 1996, pp. 164-167.
Noth et al., "Verbmobil: The Use of Prosody in the Linguistic Components of a Speech Understanding System", IEEE Transactions on Speech and Audio Processing, vol. 8, No. 5, Sep. 2000, pp. 519-532.
Odubiyi et al., "SAIRE—A Scalable Agent-Based Information Retrieval Engine", Proceedings of the First International Conference on Autonomous Agents, 1997, 12 pages.
"Integrated Audio-Graphics User Interface", IBM Technical Disclosure Bulletin, vol. 33, No. 11, Apr. 1991, pp. 368-371.
"Interactive Voice", available online at <http://www.helloivee.com/company/> retrieved from internet on Feb. 10, 2014, 2 pages.
"Meet Ivee Your Wi-Fi Voice Activated Assistant", available online at <http://www.helloivee.com/> retrieved from internet on Feb. 10, 2014, 8 pages.
"Mel Scale", Wikipedia the Free Encyclopedia, last modified on Oct. 13, 2009 and retrieved on Jul. 28, 2010, available online <http://en.wikipedia.org/wiki/Mel_scale>, 2 pages.
"Minimum Phase", Wikipedia the free Encyclopedia, Last Modified on Jan. 12, 2010 and retrieved on Jul. 28, 2010, available online at <http://en.wikipedia.org/wiki/Minimum_phase>, 8 pages.
"Speech Editor", IBM Technical Disclosure Bulletin, vol. 29, No. 10, Mar. 1987, pp. 4512-4514.
"Speech Recognition with Hidden Markov Models of Speech Waveforms", IBM Technical Disclosure Bulletin, vol. 34, No. 1, Jun. 1991, pp. 7-16.
Ex-Parte Quayle Action received for U.S. Appl. No. 12/244,713, dated Sep. 10, 2012, 5 pages.
Non Final Office Action received for U.S. Appl. No. 12/244,713, dated Dec. 23, 2011, 11 pages.
Bahl et al., "Large Vocabulary Natural Language Continuous Speech Recognition", In Proceedings of 1989 International Conference on Acoustics, Speech, and Signal Processing, vol. 1, May 23-26, 1989, 6 pages.
Notice of Allowance received for U.S. Appl. No. 12/244,713, dated Aug. 7, 2012, 7 pages.
Notice of Allowance received for U.S. Appl. No. 12/244,713, dated May 10, 2012, 5 pages.
Final Office Action received for U.S. Appl. No. 13/053,144, dated Nov. 19, 2013, 24 pages.
Non Final Office Action received for U.S. Appl. No. 13/053,144, dated Mar. 22, 2013, 18 pages.
Notice of Allowance received for U.S. Appl. No. 13/480,422, dated Jul. 19, 2012, 9 pages.
Supplemental Notice of Allowance received for U.S. Appl. No. 13/480,422, dated Sep. 27, 2012, 2 pages.
Notice of Allowance received for U.S. Appl. No. 13/604,556, dated Apr. 1, 2013, 9 pages.
Notice of Allowance received for U.S. Appl. No. 13/604,556, dated Jul. 31, 2013, 9 pages.
Acero et al., "Environmental Robustness in Automatic Speech Recognition", International Conference on Acoustics, Speech, and Signal Processing (ICASSP'90), Apr. 3-6, 1990, 4 pages.
Acero et al., "Robust Speech Recognition by Normalization of the Acoustic Space", International Conference on Acoustics, Speech, and Signal Processing, 1991, 4 pages.
Agnes et al., "Spoken Language Translator: First-Year Report", SICS Research Report, Jan. 1994, 161 pages.
Ahlborn et al., "Modeling Spectral Speech Transitions Using Temporal Decomposition Techniques", IEEE International Conference of Acoustics, Speech, and Signal Processing (ICASSP'87), vol. 12, Apr. 1987, 4 pages.
Aikawa et al., "Speech Recognition Using Time-Warping Neural Networks", Proceedings of the 1991 IEEE Workshop on Neural Networks for Signal Processing, Sep. 30 to Oct. 1, 1991, 10 pages.
Alfred App, available online at <http://www.alfredapp.com/>, retrieved on Feb. 8, 2012, 5 pages.
Allen, James, "Natural Language Understanding", 2nd Edition, 1995, 671 pages.

(56) References Cited

OTHER PUBLICATIONS

Alshawi et al., "CLARE: A Contextual Reasoning and Cooperative Response Framework for the Core Language Engine—Final Report", SRI International, available online at <http://www.cam.sri.com/tr/crc028/paper.ps.Z>, Dec. 1992, pp. 1-272.

Alshawi et al., "Declarative Derivation of Database Queries from Meaning Representations", Proceedings of the Bankai Workshop, Oct. 1991, pp. 1-12.

Alshawi et al., "Logical Forms in the Core Language Engine", Proceedings of the 27th Annual Meeting of the Association for Computational Linguistics, 1989, pp. 25-32.

Alshawi et al., "Overview of the Core Language Engine", Proceedings of Future Generation Computing Systems, Sep. 1988, pp. 1-13.

Alshawi, Hiyan, "Translation and Monotonic Interpretation/Generation", SRI International, available online at <http://www.cam.sri.com/tr/crc024/paper.ps.Z>, Jul. 1992, pp. 1-18.

Ambite et al., "Design and Implementation of the CALO Query Manager", American Association for Artificial Intelligence, 2006, 8 pages.

Ambite et al., "Integration of Heterogeneous Knowledge Sources in the CALO Query Manager", The 4th International Conference on Ontologies, DataBases, and Applications of Semantics (ODBASE), 2005, 18 pages.

Anastasakos et al., "Duration Modeling in Large Vocabulary Speech Recognition", International Conference on Acoustics, Speech, and Signal Processing (ICASSP'95), May 9-12, 1995, 4 pages.

Anderson et al., "Syntax-Directed Recognition of Hand-Printed Two-Dimensional Mathematics", In Proceedings of Symposium on Interactive Systems for Experimental Applied Mathematics: Proceedings of the Association for Computing Machinery Inc. Symposium, 1967, 12 pages.

Anonymous, "Speaker Recognition", Wikipedia, The Free Enclyclopedia, Nov. 2, 2010, 3 pages.

Ansari et al., "Pitch Modification of Speech using a Low-Sensitivity Inverse Filter Approach", IEEE Signal Processing Letters, vol. 5, No. 3, Mar. 1998, 3 pages.

Anthony et al., "Supervised Adaption for Signature Verification System", IBM Technical Disclosure, Jun. 1, 1978, 3 pages.

Appelt et al., "Fastus: A Finite-state Processor for Information Extraction from Real-world Text", Proceedings of IJCAI, 1993, 8 pages.

Appelt et al., "SRI International Fastus System MUC-6 Test Results and Analysis", SRI International, 1995, 12 pages.

Appelt et al., "SRI: Description of the JV-FASTUS System Used for MUC-5", SRI International, 1993, pp. 1-19.

Apple Computer, "Guide Maker User's Guide", © Apple Computer, Inc., Apr. 27, 1994, 8 pages.

Apple Computer, "Introduction to Apple Guide", © Apple Computer, Inc., Apr. 28, 1994, 20 pages.

Apple Computer, "Knowledge Navigator", available online at <http://www.youtube.com/watch?v=QRH8eimU_20>, Uploaded on Apr. 29, 2008, 7 pages.

Archbold et al., "A Team User's Guide", SRI International, Technical Note 254, Dec. 21, 1981, 70 pages.

Asanovic et al., "Experimental Determination of Precision Requirements for Back-Propagation Training of Artificial Neural Networks", In Proceedings of the 2nd International Conference of Microelectronics for Neural Networks, 1991, www.ICSI.Berkelev.EDU, 1991, 7 pages.

Atal et al., "Efficient Coding of LPC Parameters by Temporal Decomposition", IEEE International Conference on Acoustics, Speech, and Signal Processing (ICASSP'83), Apr. 1983, 4 pages.

Bahl et al., "A Maximum Likelihood Approach to Continuous Speech Recognition", IEEE Transaction on Pattern Analysis and Machine Intelligence, vol. PAMI-5, No. 2, Mar. 1983, 13 pages.

Bahl et al., "A Tree-Based Statistical Language Model for Natural Language Speech Recognition", IEEE Transactions on Acoustics, Speech and Signal Processing, vol. 37, No., Jul. 1989, 8 pages.

Bahl et al., "Acoustic Markov Models Used in the Tangora Speech Recognition System", In Proceeding of International Conference on Acoustics, Speech, and Signal Processing (ICASSP'88), vol. 1, Apr. 11-14, 1988, 4 pages.

Bulyko et al., "Error-Correction Detection and Response Generation in a Spoken Dialogue System", Speech Communication, vol. 45, 2005, pp. 271-288.

Cheyer, Adam, "About Adam Cheyer", available online at <http://www.adam.cheyer.com/about.html>, retrieved from Internet on Sep. 17, 2012, 2 pages.

Codd, E. F., "Databases: Improving Usability and Responsiveness—How About Recently", 1978, pp. 3-28.

Cohen et al., "An Open Agent Architecture", SRI International, 1994, pp. 1-8.

Coles et al., "Chemistry Question-Answering", Technical Note 9, Jun. 1969, 15 pages Coles et al., "Techniques for Information Retrieval Using an Inferential Question-Answering System with Natural Language Input", Technical Note74, Nov. 1972, 198 Pages.

Coles Stephen L., "The Application of Theorem Proving to Information Retrieval", Technical Note 51, Jan. 1971, 21 pages.

Conklin, "Hypertext: An Introduction and Survey", Computer Magazine, Sep. 1987, 25 pages.

Connolly et al., "Fast Algorithms for Complex Matrix Multiplication Using Surrogates", IEEE Transactions on Acoustics, Speech, and Signal Processing, vol. 37, No. 6, Jun. 1989, 13 pages.

Constantinides et al., "A Schema Based Approach to Dialog Control", Proceedings of the International Conference on Spoken Language Processing, 1998, 4 pages.

Cox et al., "Speech and Language Processing for Next-Millennium Communications Services", Proceedings of the IEEE, vol. 88, No. 8, Aug. 2000, pp. 1314-1337.

Craig et al., "Deacon: Direct English Access and Control", AFIPS Conference Proceedings, vol. 29, Nov. 7-10, 1966, pp. 365-380.

Cutkosky et al., "PACT: An Experiment in Integrating Concurrent Engineering Systems", Jan. 1993, pp. 1-13.

Dar et al., "DTL's DataSpot: Database Exploration Using Plain Language", Proceedings of the 24th VLDB Conference, 1998, pp. 645-649.

Davis et al., "A Personal Handheld Multi-Modal Shopping Assistant", IEEE, 2006, 9 pages.

Decker et al., "Designing Behaviors for Information Agents", Jul. 6, 1996, pp. 1-15.

Decker et al., "Matchmaking and Brokering", May 16, 1996, pp. 1-19.

Deerwester et al., "Indexing by Latent Semantic Analysis", Journal of the American Society for Information Science, vol. 41, No. 6, Sep. 1990, 19 pages.

Deller, Jr., et al., "Discrete-Time Processing of Speech Signals", May 13, 1993, pp. 114-137.

Digital Equipment Corporation, "Open VMS Software Overview", Dec. 1995, 159 pages.

Domingue et al., "Web Service Modeling Ontology (WSMO)—An Ontology for Semantic Web Services", Position paper at the W3C Workshop on Frameworks for Semantics in Web Services, Jun. 9-10, 2005, 6 pages.

Donovan, Robert E., "A New Distance Measure for Costing Spectral Discontinuities in Concatenative Speech Synthesisers", 2001, 4 pages.

Dowding et al., "Gemini: A Natural Language System for Spoken-Language Understanding", Proceedings of the Thirty-First Annual Meeting of the Association for Computational Linguistics, 1993, 8 pages.

Dowding et al., "Interleaving Syntax and Semantics in an Efficient Bottom-Up Parser", Proceedings of the 32nd Annual Meeting of the Association for Computational Linguistics, 1994, 7 pages.

Elio et al., "On Abstract Task Models and Conversation Policies", 1999, pp. 1-10.

Epstein et al., "Natural Language Access to a Melanoma Data Base", Technical Note 171, Sep. 1978, 7 pages.

Ericsson et al., "Software Illustrating a Unified Approach to Multimodality and Multilinguality in the in-home Domain", Talk and Look: Tools for Ambient Linguistic Knowledge, Dec. 22, 2006, 127 pages.

(56) References Cited

OTHER PUBLICATIONS

Evi, "Meet Evi: The One Mobile App that Provides Solutions for Your Everyday Problems", avialable online at <http://www.evi.com/>, retrieved on Feb. 8, 2012, 3 pages.
Grosz et al., "Dialogic: A Core Natural-Language Processing System", SRI International, Nov. 9, 1982, 17 pages.
Exhibit, 1, "Natural Language Interface Using Constrained Intermediate Dictionary of Results", List of Publications Manually reviewed for the Search of U.S. Pat. No. 7,177,798, Mar. 22, 2013, 1 page.
Feigenbaum et al., "Computer-assisted Semantic Annotation of Scientific Life Works", Oct. 15, 2007, 22 pages.
Ferguson et al., "TRIPS: An Integrated Intelligent Problem-Solving Assistant", Proceedings of the Fifteenth National Conference on Artificial Intelligence (AAAI-98) and Tenth Conference on Innovative Applications of Artificial Intelligence (IAAI-98), 1998, 7 pages.
Fikes et al., "A Network-based knowledge Representation and its Natural Deduction System", SRI International, Jul. 1977, 43 pages.
Frisse, M. E., "Searching for Information in a Hypertext Medical Handbook", Communications of the ACM, vol. 31, No. 7, Jul. 1988, 8 pages.
Gamback et al., "The Swedish Core Language Engine", NOTEX Conference, 1992, 17 pages.
Gannes, Liz, "Alfred App Gives Personalized Restaurant Recommendations", AllThingsD, Jul. 18, 2011, pp. 1-3.
Gautier et al., "Generating Explanations of Device Behavior Using Compositional Modeling and Causal Ordering", CiteSeerx, 1993, pp. 89-97.
Gervasio et al., "Active Preference Learning for Personalized Calendar Scheduling Assistancae", CiteSeerx, In Proc. of IUI'05, Jan. 9-12, 2005, pp. 90-97.
Glass et al., "Multilingual Language Generation Across Multiple Domains", International Conference on Spoken Language Processing, Japan, Sep. 18-22, 1994, 5 pages.
Glass et al., "Multilingual Spoken-Language Understanding in the Mit Voyager System", <http://groups.csail.mit.edu/sls/publications/1995/speechcomm95-voyager.pdf>, Aug. 1995, 29 pages.
Glass, Alyssa, "Explaining Preference Learning", CiteSeerx, 2006, pp. 1-5.
Goddeau et al., "A Form-Based Dialogue Manager for Spoken Language Applications", http://phasedance.com/pdf!icslp96.pdf, Oct. 1996, 4 pages.
Goddeau et al., "Galaxy: A Human-Language Interface to On-Line Travel Information", International Conference on Spoken Language Processing 1994, Yokohama, 1994, pp. 707-710.
Goldberg et al., "Using Collaborative Filtering to Weave an Information Tapestry", Communications of the ACM, vol. 35, No. 12, Dec. 1992, 10 pages.
Gorin et al., "On Adaptive Acquisition of Language", International Conference on Acoustics, Speech, and Signal Processing (ICASSP'90), vol. 1, Apr. 3-6, 1990, 5 pages.
Gotoh et al., "Document Space Models Using Latent Semantic Analysis", In Proceedings of Eurospeech, 1997, 4 pages.
Gray, R. M., "Vector Quantization", IEEE ASSP Magazine, Apr. 1984, 26 pages.
Green, C., "The Application of Theorem Proving to Question-Answering Systems", SRI Stanford Research Institute, Artificial Intelligence Group, Jun. 1969, 169 pages.
Gregg et al., "DSS Access on the WWW: An Intelligent Agent Prototype", Proceedings of the Americas Conference on Information Systems-Association for Information Systems, 1998, 3 pages.
Grishman et al., "Computational Linguistics: An Introduction", © Cambridge University Press, 1986, 172 pages.
Ward et al., "Recent Improvements in the CMU Spoken Language Understanding System", ARPA Human Language Technology Workshop, 1994, pp. 213-216.
Ward, Wayne, "The CMU Air Travel Information Service: Understanding Spontaneous Speech", Proceedings of the Workshop on Speech and Natural Language, HLT '90, 1990, pp. 127-129.
Warren, "An Efficient Easily Adaptable System for Interpreting Natural Language Queries", American Journal of Computational Linguistics, vol. 8, No. 3-4, Jul.-Dec. 1982, pp. 110-119.
Weizenbaum, Joseph, "ELIZA—A Computer Program for the Study of Natural Language Communication Between Man and Machine", Communications of the ACM, vol. 9, No. 1, Jan. 1966, pp. 36-45.
Werner et al., "Prosodic Aspects of Speech," Universite de Lausanne, Switzerland, 1994, Fundamentals of Speech Synthesis and Speech Recognition: Basic Concepts, State of the Art, and Future Challenges, 1994, pp. 23-40.
Winiwarter et al., "Adaptive Natural Language Interfaces to FAQ Knowledge Bases", Proceedings of 4th International Conference on Applications of Natural Language to Information Systems, Austria, Jun. 17-19, 1999, 22 pages.
Wolff, Mark, "Poststructuralism and the ARTFUL Database: Some Theoretical Considerations", Information Technology and Libraries, vol. 13, No. 1, Mar. 1994, 10 pages.
Wu et al., "KDA: A Knowledge-based Database Assistant", Data Engineering, Proceeding of the Fifth International Conference on Engineering (IEEE Cat No. 89CH2695-5), Feb. 6-10, 1989, pp. 402-409.
Wu, Min, "Digital Speech Processing and Coding", ENEE408G Capstone-Multimedia Signal Processing, Spring 2003, Lecture-2 Course Presentation, University of Maryland, College Park, 2003, pp. 1-8.
Wu, Min, "Speech Recognition, Synthesis, and H.C.I.", ENEE408G Capstone-Multimedia Signal Processing, Spring 2003, Lecture-3 course presentation, University of Maryland, College Park, 2003, pp. 1-11.
Wyle, M. F., "A Wide Area Network Information Filter", In Proceedings of First International Conference on Artificial Intelligence on Wall Street, Oct. 9-11, 1991, pp. 10-15.
Yang et al., "Smart Sight: A Tourist Assistant System", Proceedings of Third International Symposium on Wearable Computers, 1999, 6 pages.
Yankelovich et al., "Intermedia: The Concept and the Construction of a Seamless Information Environment", IEEE Computer Magazine, Jan. 1988, pp. 81-96.
Yoon et al., "Letter-to-Sound Rules for Korean", Department of Linguistics, The Ohio State University, 2002, 4 pages.
Zeng et al., "Cooperative Intelligent Software Agents", The Robotics Institute, Carnegie-Mellon University, Mar. 1995, 13 pages.
Zhao Leon., "Intelligent Agents for Flexible Workflow Systems", Proceedings of the Americas Conference on Information Systems (AMCIS), 1998, pp. 237-239.
Zhao, Y., "An Acoustic-Phonetic-Based Speaker Adaptation Technique for Improving Speaker-Independent Continuous Speech Recognition", IEEE Transactions on Speech and Audio Processing, vol. 2, No. 3, Jul. 1994, pp. 380-394.
Zovato et al., "Towards Emotional Speech Synthesis: A Rule based Approach", Proceedings 5TH ISCA Speech Synthesis Workshop—Pittsburgh, 2004, pp. 219-220.
Zue et al., "From Interface to Content: Translingual Access and Delivery of On-Line Information", EUROSPEECH, 1997, 4 pages.
Zue et al., "Jupiter: A Telephone-Based Conversational Interface for Weather Information", IEEE Transactions on Speech and Audio Processing, Jan. 2000, pp. 100-112.
Zue et al., "Pegasus: A Spoken Dialogue Interface for On-Line Air Travel Planning", Elsevier, Speech Communication, vol. 15, 1994, 10 pages.
Zue et al., "The Voyager Speech Understanding System: Preliminary Development and Evaluation", Proceedings of IEEE 1990 International Conference on Acoustics, Speech, and Signal Processing, 1990, pp. 73-76.
Zue, Victor, "Conversational Interfaces: Advances and Challenges", Spoken Language System Group <http://www.cs.cmu.edu/-dod/papers/zue97.pdf>, Sep. 1997, 10 pages.
Zue, Victor W., "Toward Systems that Understand Spoken Language", ARPA Strategic Computing Institute, Feb. 1994, pp. 51-59.

\* cited by examiner

Personal Device 800

Personal Device 700

METHOD FOR EXTRACTING SALIENT DIALOG USAGE FROM LIVE DATA

FIELD

This relates generally to virtual assistants and, more specifically, to mechanisms for using live data for recognition of requests provided to virtual assistants.

BACKGROUND

Electronic devices are able to access an increasingly larger and more diverse quantity of functions, services, and information, both via the Internet and from other sources. Functionality for such devices continues to improve rapidly, with advances in both hardware and software applications of consumer devices, smartphones, tablet computers, and the like. In many instances, each software application, function, website, or other feature can have its own user interface and operational models, which can be difficult to learn and even overwhelming for some novice users. Moreover, many users may overlook or be unaware of the extensive device functionality and information available to them. Such users may be unable to use certain resources effectively, and some users may become frustrated or overwhelmed by the growing capabilities of consumer devices.

In addition to novice users, a variety of other individuals may find it difficult to effectively utilize the many features available on consumer devices. For example, individuals who are impaired, disabled, elderly, busy, distracted, operating a vehicle, engaged in certain activities, or the like may have difficulty interfacing with their electronic devices safely and effectively. Such users can also be particularly likely to find it difficult to navigate the large number of diverse functions, applications, websites, features, and the like that may be available.

An intelligent automated assistant (or virtual assistant) can beneficially provide an improved interface between a human user and an electronic device that addresses the needs of certain users while also providing enhanced functionality for even expert users. For example, a virtual assistant can facilitate effective use of the varied functions, applications, websites, features, and the like that may be available.

In some examples, a virtual assistant can function by recognizing and responding to known requests in predetermined ways. A virtual assistant, however, may not yet recognize and may not yet be trained to respond to a variety of new requests from users that may change over time. For example, users can request information from a new source, request information from a known source in a new way, request a certain function using as-yet unrecognized terminology, request a new function for a new software application, or the like. In addition, recognized or known source information can become outdated over time, and the virtual assistant may not recognize new terminology employed by users to refer to updated information. For example, users may request information related to future events (e.g., a movie premier), but the virtual assistant may not yet recognize related terminology (e.g., the new movie title). Accordingly, a virtual assistant can receive user requests that it is unable to effectively handle as, for example, source information changes over time and as users make new requests or make certain requests in new ways.

SUMMARY

Systems and processes are disclosed for virtual assistant request recognition using live usage data and anticipated or future data. In one example, a user request received by a virtual assistant can be compared to known request templates to determine how to respond. If the received request is not recognized, the received request can be used to develop candidate request templates that can be stored and tracked to determine the salience of each of the candidate request templates. For example, candidate templates formed from unrecognized user requests can be stored in a database. As new candidate templates are received, they can be compared to candidate templates already in the database. When matching candidate templates are identified, a count associated with matched candidate templates can be incremented to reflect how frequently the candidate template has been identified from received requests. When a count associated with a candidate template reaches a threshold level, the corresponding candidate template can be considered salient and can be used to train the virtual assistant to recognize similar requests in the future (e.g., an associated language model can be trained with the candidate templates).

In some examples, a virtual assistant can be trained with data that is expected to appear in future user requests. Data relating to future events can be received, and names, dates, addresses, and like information can be extracted from the received data. The extracted data can be used to populate or seed recognized user request templates to generate new populated request templates (e.g., whole user utterances). The populated request templates can be used to train a virtual assistant, such that when the future data becomes relevant, the virtual assistant can be prepared to recognize and respond to related user requests.

In other examples, data relating to future events can be combined with candidate request templates that a virtual assistant may not yet recognize. For example, names, dates, addresses, and the like extracted from data relating to future events can be used to populate or seed candidate request templates that have been deemed salient based on how frequently they have been received. The populated candidate request templates can be used to train a virtual assistant along with training the virtual assistant to recognize and respond to the corresponding unpopulated candidate request templates.

DETAILED DESCRIPTION

Figure 1:
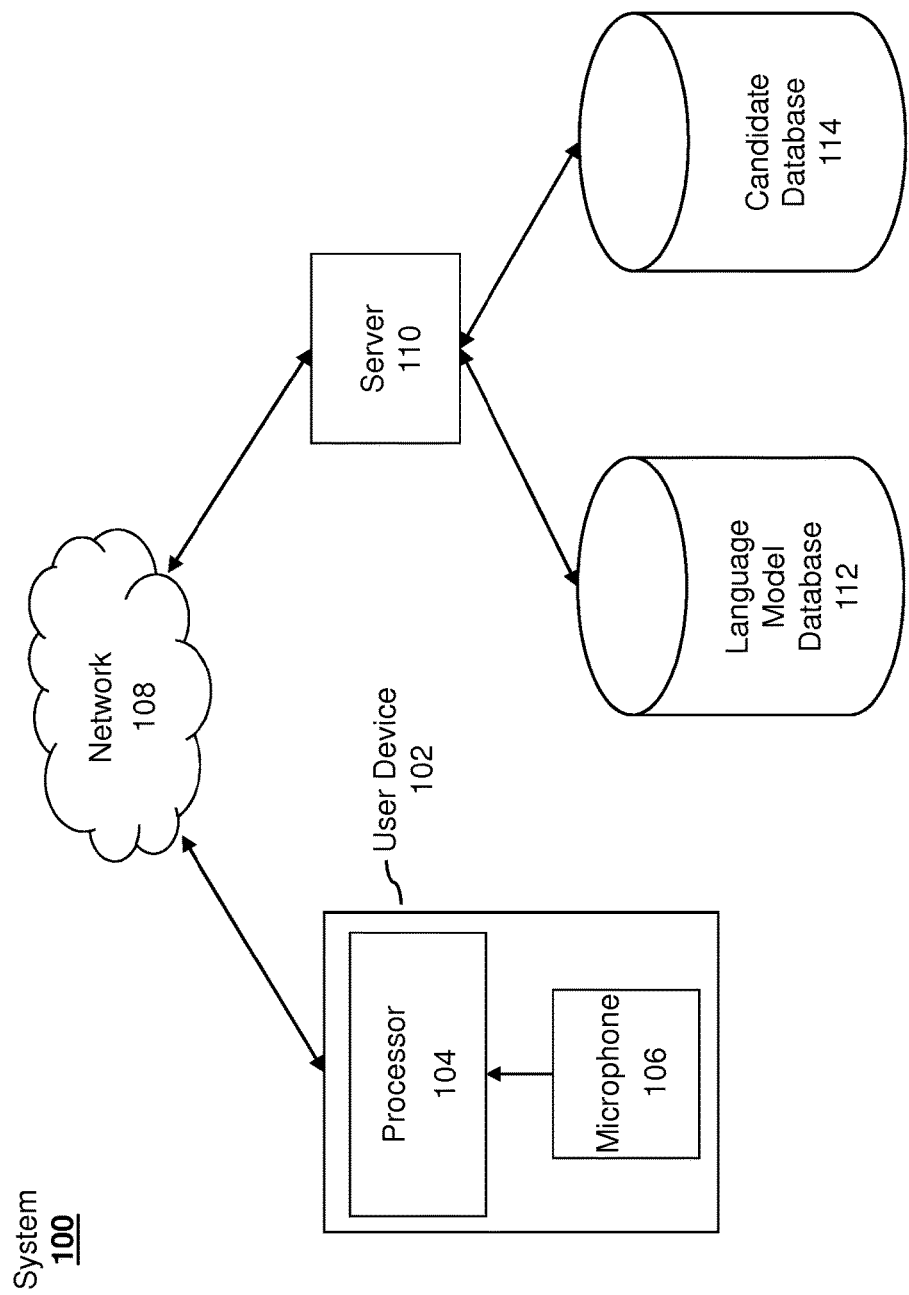
FIG. 1 illustrates an exemplary system for request recognition for a virtual assistant.

In the following description of examples, reference is made to the accompanying drawings in which is shown by way of illustration specific examples that can be practiced. It is to be understood that other examples can be used and changes can be made without departing from the scope of the various examples.

This relates to virtual assistant request recognition using live usage data and anticipated or future data. In one example, a received user request can be compared to known or recognized request templates to determine how to respond. If the received request is not recognized (e.g., a matching known request template is not found), the received request can be used to develop candidate request templates that can be stored and tracked to determine the salience of each of the candidate request templates. For example, a user request can be parsed into a variety of candidate templates based on combinations and sub-combinations of parsed phrases (or n-grams) of the request. Each of the candidate templates can be compared to previously stored candidate templates to determine whether each template has been developed from a prior user request from the same or a different user. When matching candidate templates are identified, a count associated with matched candidate templates can be incremented to reflect how frequently the candidate template has been identified from received requests.

As the same candidate template is identified multiple times from various as yet unrecognized user requests, the count associated with a particular candidate template can increase significantly. When the count associated with a particular candidate template reaches a threshold level, a notification can be generated including the candidate request template to indicate that the candidate request template may be salient and useful for language models used to recognize and respond to user requests. In some examples, when a count reaches a threshold level, an associated candidate request template can be automatically included in virtual assistant language models or otherwise used to train virtual assistants to recognize the user request in the future. By training virtual assistants (or training language models associated with virtual assistants) with candidate request templates that appear frequently enough to be considered salient, virtual assistants can more effectively recognize and respond to user requests and adapt as user requests change over time.

In another example, virtual assistants can be trained with anticipated or future data (e.g., data relating to a future event). Anticipated or future data can be received or mined from a variety of sources, such as news feeds, blogs, websites, or the like. A variety of names, event details, dates, and other information can be extracted from the received data. The extracted data can then be used to generate new populated request templates or request enumerations (e.g., complete expected user utterances) by populating or seeding known user request templates with the future data (e.g., inserting future data into request templates). For example, new populated request templates can be specific user requests, including entities or defined variables that a virtual assistant can use to formulate a particular response (e.g., detailed requests including specific search terms that a virtual assistant can recognize in order to provide a response directly related to the specific search terms).

The new populated request templates can be used to train a virtual assistant, such that when the future data becomes relevant, the virtual assistant can be prepared to recognize and respond to related user requests. For example, request templates relating to movies can be populated with details for a movie that will be released at a future date (e.g., a new movie title, new actors, new director, etc.). The populated request templates based on the future movie release date can then be used to train a virtual assistant in anticipation of future user requests relating to the movie. By training a virtual assistant based on anticipated or future data, the virtual assistant can more effectively recognize and respond to user requests related to current events, and in general can more effectively anticipate user needs that change over time.

In yet another example, anticipated or future data can be used to populate candidate request templates that a virtual assistant may not yet recognize. As described above, frequently appearing user requests that may not yet be recognized can be used to identify salient candidate request templates that can be useful for training a virtual assistant. Instead of or in addition to training a virtual assistant with new candidate request templates, anticipated or future data can be used to generate populated requests templates (e.g., complete expected user utterances) based on the identified salient candidate request templates. The populated candidate request templates can then be used to train a virtual assistant to recognize anticipated user requests based on newly identified request templates. In this manner, a virtual assistant can be made more robust by adapting to new and changing user request templates as well as anticipating and preemptively adapting to accommodate expected future user needs.

Accordingly, identifying new salient request templates from live usage data and anticipating future user needs based on data relating to future events can advantageously improve virtual assistant request recognition and overall virtual assistant utility. It should be understood, however, that still many other advantages can be achieved according to the various examples discussed herein.

FIG. 1 illustrates exemplary system 100 for request recognition for a virtual assistant. In one example, system 100 can include user device 102 that can provide an interface for interacting with a virtual assistant. User device 102 can include any of a variety of devices, such as a cellular telephone (e.g., smartphone), tablet computer, laptop computer, desktop computer, portable media player, wearable digital device (e.g., digital glasses, wristband, wristwatch, brooch, armband, etc.), or the like. In some examples, user device 102 can include microphone 106 that can record spoken user requests. In other examples, user device 102 can include a variety of other mechanisms for receiving input from a user, such as a touchscreen, keyboard, mouse, optical sensor, camera, gesture recognition sensor, proximity sensor, ambient light sensor, or the like. Although microphone 106 is illustrated in the example of system 100 for receiving spoken user requests, user device 102 can receive user requests for a virtual assistant using any available input mechanisms (e.g., receiving text via a keyboard, text via a touchscreen, gestures via a camera, instructional barcodes via a camera, instructional quick response (QR) codes via a camera, instructions via a near field communication sensor, etc.).

User device 102 can also include processor 104, which can receive user requests and process the requests in any number of ways. For example, processor 104 can cause an audio file of a spoken user request to be transmitted to server 110 through network 108. Network 108 can include any of a variety of networks, such as a cellular telephone network, WiFi network, wide area network, local area network, the Internet, or the like. In another example, processor 104 can cause a spoken user request to be transcribed into a textual request or translated into a different format useable by the virtual assistant for processing the request, and can cause the transcribed request to be transmitted to server 110 through network 108. Processor 104 can also run some or all of the instructions for providing the interface for the virtual assistant (e.g., prompting a user for a request, causing audio to be played, causing information to be displayed, etc.).

In some examples, server 110 can include a language processor for performing speech recognition. For example, server 110 can be configured to recognize a speech sequence by decoding the acoustics that represent speech sounds and using a language model to place constraints on the acoustic sequence to estimate the most likely spoken word sequence that makes up a user request. In system 100, language model database 112 can include various constraints, user request templates, interpretation likelihoods, domain boundaries, and a variety of other information to facilitate accurate speech recognition and ultimately accurate determination of a user request. The spoken word sequence can be parsed by a natural language engine (not shown) that can derive user intent (e.g., determine the functional request that a virtual assistant can process and act upon to respond to the request). In some examples, acoustic models can be trained on speech audio while language models can be trained on recognized text data to robustly estimate the likelihoods of particular n-gram sequences (e.g., parsed portions of a request). It should be understood that training a virtual assistant can include training an associated acoustic model, training an associated language model, or both.

Other aspects relating to virtual assistant technology are disclosed in the following references: U.S. Patent Publication No. 2012/0016678 for "Intelligent Automated Assistant," the disclosure of which is incorporated herein by reference; and U.S. Patent Publication No. 2012/0265528 for "Using Context Information to Facilitate Processing of Commands in a Virtual Assistant," the disclosure of which is incorporated herein by reference.

In some examples, speech recognition accuracy can be enhanced by training both acoustic and language models on large sets of real world usage data. As speech changes (e.g., different word choice, altered phrasing, etc.), and as new terminology emerges to describe current ideas, events, and the like, models trained on older data can become outdated. For example, models trained on only text-based data sources can miss changes over time in spoken dialogue. To improve accuracy, live usage data can be employed as part of the training for virtual assistants in general and for acoustic and language models in particular. As discussed below with reference to process 220 of FIG. 2, candidate database 114 of system 100 can be used to track live usage data, and in particular, track the salience of unrecognized user requests to determine whether such requests should be used for training a virtual assistant or language model.

Although FIG. 1 illustrates server 110, language model database 112, and candidate database 114 as being separated from user device 102 by network 108, it should be appreciated that, in other examples, the functions of server 110 can be performed by processor 104 on user device 102, and databases 112 and 114 can likewise be stored on user device 102. In such examples, speech recognition and other language processing functions can be performed directly on user device 102, and the techniques discussed herein for request recognition can similarly be performed on user device 102.

It should likewise be understood that many variations are possible for a system that can be used according to the examples herein for virtual assistant request recognition. For example, although FIG. 1 illustrates databases 112 and 114 as separate storage entities, both can be stored on a single storage device, each can be distributed across multiple storage devices, some or all of the databases can be stored within user device 102, and many other variations are also possible.

Figure 2:
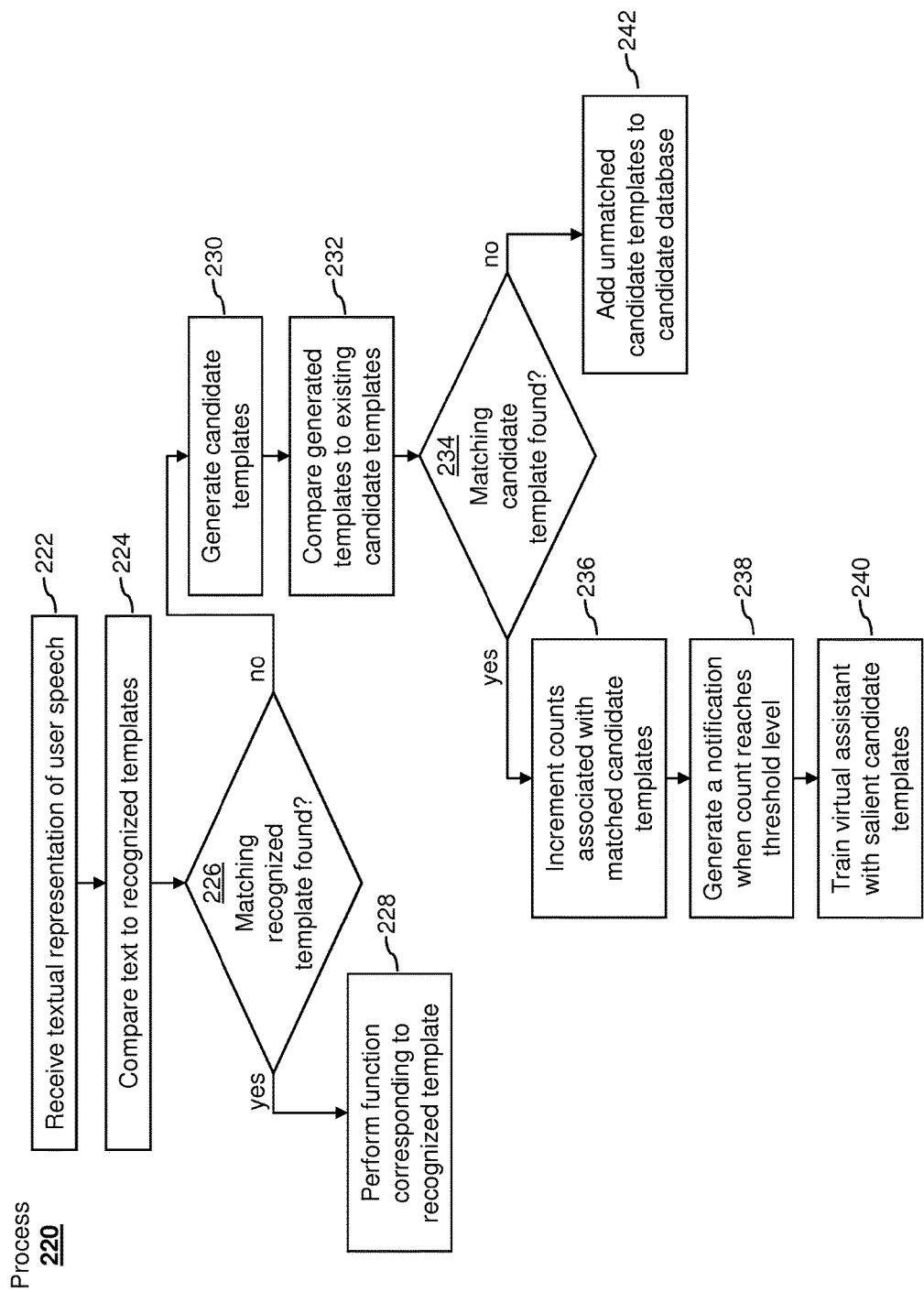
FIG. 2 illustrates an exemplary process for request recognition for a virtual assistant.

FIG. 2 illustrates exemplary process 220 for request recognition for a virtual assistant. Process 220 can, for example, be executed on server 110 of system 100 utilizing language model database 112 and candidate database 114 discussed above with reference to FIG. 1. At block 222, a textual representation of user speech can be received. Although not shown in FIG. 2, prior to block 222, a spoken user request can be received in audio format and transcribed into a textual format according to any of a variety of speech recognition methods. Such transcription can be performed on a user device (e.g., user device 102 of FIG. 1), on a server (e.g., server 110 of FIG. 1), or on another device. In some examples, speech recognition can be performed using an acoustic model.

User speech can be directed to a virtual assistant via an interface on a user device, and can include any of a variety of user requests. For example, user requests can include a command for the virtual assistant to perform a certain function (e.g., compose an email, send a text message, initiate a phone call, launch an application, play an audio file, etc.). In other examples, user requests can include a request for information (e.g., sports scores, directions, restaurant recommendations, theater schedules, weather, stocks, internet searches, encyclopedia entries, etc.). In still other examples, user requests can include dialogue directed to the virtual assistant or requests relating to the virtual assistant (e.g., statements personifying the virtual assistant, queries of the functional capabilities of the virtual assistant, statements defining preferences for virtual assistant interaction, etc.). It should be appreciated that user requests need not be limited to queries or commands, but can include any interaction between a user and the virtual assistant. It should likewise be understood that user speech and user requests of any type can be received, and the virtual assistant can be trained to provide meaningful responses to any type of user speech or request.

Figure 3:
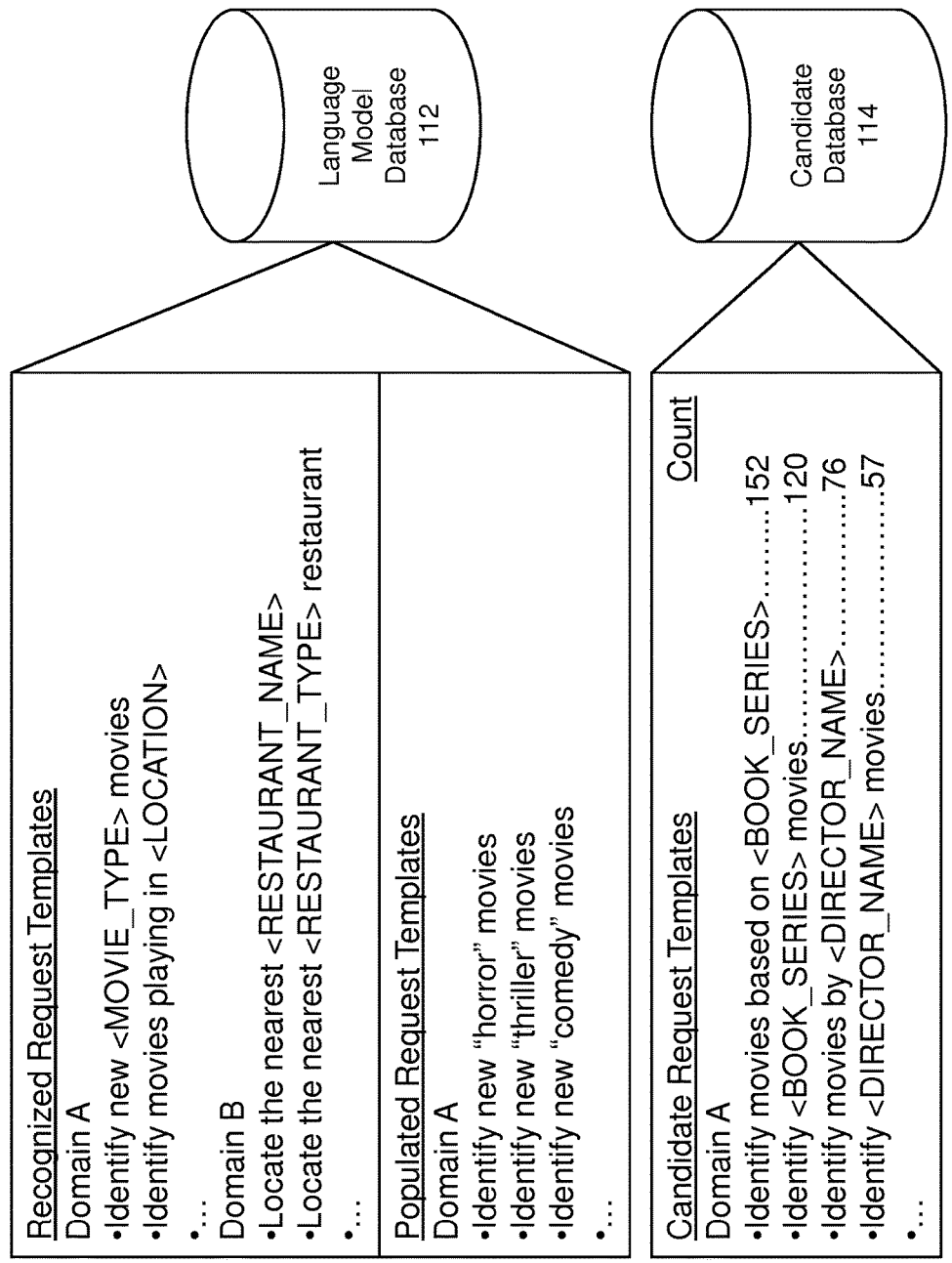
FIG. 3 illustrates exemplary virtual assistant request templates.

At block 224, the received textual representation of user speech can be compared to recognized user request templates (e.g., exemplars or use cases identifying a particular user request to which a virtual assistant is trained to respond). In some examples, recognized user request templates can form part of a language model, such as that stored in language model database 112 of FIG. 1. In general, a language model associated with a virtual assistant can define how the virtual assistant responds to known user requests (e.g., can enumerate the requests to which a virtual assistant is trained to respond). The received textual representation of user speech can be compared to all or some subset of the recognized user request templates in a language model, database, or the like. FIG. 3 illustrates exemplary virtual assistant request templates, including recognized request templates stored in language model database 112. Although not shown, recognized user request templates can be stored along with corresponding functions that a virtual assistant can perform in response to receiving a particular user request. For example, a recognized user request template can be stored along with an instruction, set of steps, phrase, command, or the like that a virtual assistant can execute or otherwise use to respond to a recognized request.

In some examples, user request templates can include variables, entities, operands, search terms, or the like that a virtual assistant can use in performing a corresponding function. For example, as illustrated in FIG. 3, one exemplary recognized user request template could include "Identify new <MOVIE_TYPE> movies." The variable <MOVIE_TYPE> can indicate that whatever entity appears in a user request in that position could be used to perform the function corresponding to the request. In this example, a user could request that the virtual assistant identify new honor movies (e.g., "honor" may be the <MOVIE_TYPE> entity). In response, the virtual assistant may execute a function that searches for recently-released movies by genre, using the entity "honor" to narrow the search results to horror films and thereby provide a meaningful response to the user request.

In some examples, variables or entities can be implied in a user request. For example, another exemplary user request template could include "Locate the nearest <RESTAURANT_TYPE> restaurant." In this example, the virtual assistant could perform a corresponding search function that incorporates both the explicitly stated restaurant type as well as the implicit variable of the user's current location to find nearby restaurants of a particular type. For example, a user can request that the virtual assistant identify the nearest Thai restaurant. In response, the virtual assistant can perform a corresponding search function that locates Thai restaurants and filters them for proximity.

Although not shown in process 220 of FIG. 2, in some examples, text received at block 222 can be analyzed and used to identify a domain or a set of domains corresponding to the user request to limit the field of potential request templates for comparison at block 224. As illustrated in FIG. 3, recognized request templates can be segmented into different domains (e.g., Domain A, Domain B, etc.). A domain can indicate a subject, genre, area of interest, group of similar requests, or the like. For example, Domain A of FIG. 3 can represent a movie domain that includes requests related to movies, theater schedules, theater locations, movie facts, videos available for viewing on a user device, and the like. Domain B, on the other hand, can represent a restaurant domain that includes requests related to restaurants, foods, restaurant locations, restaurant types, restaurant reviews, reservation systems, and the like.

In some examples, segmenting database 112 into different domains can improve speech recognition and user request interpretation. For example, words appearing in a user request can be used to narrow the field of potential user request matches to a corresponding domain or a subset of all domains. For a movie domain, for example, words like "movies," "theater," "showing," "playing," "starring," "director," "actor," or the like could be used during speech recognition to narrow a template search to the movie domain. Domain segmentation can also help disambiguate user intent when, for example, entities or request terms may be confusing and difficult to accurately recognize or interpret.

Referring again to process 220 of FIG. 2, at block 226, a determination can be made of whether or not a matching recognized user request template has been found at block 224 from comparing the received textual representation of user speech to recognized user request templates (e.g., those request templates forming part of a language model associated with a virtual assistant). It should be appreciated that a "matching" template need not be identical to the textual representation of user speech. A template can be recognized as a positive match even though users may employ different terminology in formulating a request. For example, a template may include the word "identify," but synonyms of "identify" can be considered positive matches, such as "find," "locate," "list," "get," "show," and the like. A template can also be recognized as a positive match even though the order of words in a request may differ from a template. For example, "Locate Thai restaurants near me" and "Find nearby Thai restaurants" could both match a common request template, such as "Locate the nearest <RESTAURANT_TYPE> restaurant." Many other request variations are also possible that can still be recognized as positively matching a request template.

If a matching recognized user request template is found (e.g., the "yes" branch of block 226), a function corresponding to the recognized user request template can be performed at block 228. For example, a virtual assistant can be trained to identify movies playing near a particular location in response to the user request template "Identify movies playing in <LOCATION>." The request template can be included in a language model associated with the virtual assistant, and the template could be identified as matching a corresponding user request, such as "Find movies playing in Sacramento, Calif." After recognizing that the user request matches the template "Identify movies playing in <LOCATION>," the virtual assistant can perform the corresponding function of searching for movies playing in theaters located in or near Sacramento, Calif. It should be appreciated that functions attributed to the virtual assistant can be performed by software executing on a server, a user device, and/or another device. For example, virtual assistant software executing on a server can perform the search function and send the results to the user device; virtual assistant software executing on the user device can then cause the results to be displayed, read out, or otherwise provided to the user.

If no matching recognized user request template is found (e.g., the "no" branch of block 226), candidate templates can be generated at block 230 based on the received textual representation of user speech. In some examples, candidate request templates can be generated based on various combinations of the words in a received request. In other examples, candidate request templates can be generated by removing an entity or removing different words or portions of a user request. In still other examples, candidate request templates can be generated by parsing a received request into different n-grams and forming new candidate templates from different numbers and orders of the n-grams. It should be appreciated that a received request can be maintained whole and/or broken up in a variety of ways to generate candidate request templates.

In one example, an unrecognized user request could include "Show movies playing nearby." At block 230, various candidate request templates could be generated from such a request, such as "Show < >," "Show < > nearby," "Show movies < >," "Show movies playing < >," "Show < > playing," "Show < > playing nearby," "Show < > playing < >," etc., along with the unmodified request itself. Various candidate request templates can thus be generated from a received request.

Referring again to process 220 of FIG. 2, at block 232, generated candidate request templates can be compared to existing candidate request templates. In one example, the various candidate request templates formed at block 230 from a received request can each be compared to previously generated and stored candidate request templates. As illustrated in FIG. 3, candidate request templates can be stored in candidate database 114. In some examples, candidate request templates can be organized by expected usage domain, such as Domain A shown in FIG. 3 (which may be a movie or theater domain). The expected usage domain can be determined based on words in a received request, contextual cues from prior virtual assistant interaction, contextual cues from subsequent virtual assistant interaction (e.g., repeating a request, correcting a transcribed request, etc.), or in other ways. In some examples, the expected usage domain can be used to narrow the field of search for matching candidate request templates.

Although FIG. 3 illustrates candidate request templates as including a defined entity placeholder (e.g., <BOOK_SERIES>, <DIRECTOR_NAME>), in other examples, a generic entity placeholder can be included in candidate templates (e.g., "Identify movies based on < >"), candidate templates might include a defined entity (e.g., "Identify movies based on 'The Lord of the Rings'"), or candidate templates might be constructed in other ways for tracking as desired.

Referring again to process 220 of FIG. 2, at block 234, a determination can be made as to whether a matching candidate request template has been found in a database of previously-generated and stored candidate request templates (e.g., candidate database 114). In some examples, "matching" can occur without requiring identical similarity (e.g., candidate templates can be considered matching despite minor variations, such as synonyms, pluralities, connecting words, or the like). If no already-stored matching candidate request template has been found (e.g., the "no" branch of block 234), the unmatched candidate template can be added to a candidate database at block 242. For example, if no match has been found after comparing a generated request template to already-stored candidate templates in a candidate database, the generated request template can be added to the candidate database, such as candidate database 114.

If, however, an already-stored matching candidate request template has been found (e.g., the "yes" branch of block 234), a count associated with a matched candidate template can be incremented. Incrementing the count can reflect, for example, that a particular candidate template has once again been generated from a received and unrecognized user request. FIG. 3 illustrates a count associated with various candidate request templates stored in candidate database 114. For example, candidate request template "Identify movies based on <BOOK_SERIES>" has an associated count of 152, which can indicate that the candidate template has been generated from received and unrecognized user requests 152 times. Similarly, candidate request template "Identify <DIRECTOR_NAME> movies" has an associated count of 57, which can indicate that the candidate template has been generated from received and unrecognized user requests 57 times.

Referring again to process 220 of FIG. 2, at block 238, a notification can be generated when a count associated with a candidate template reaches a threshold level. In some examples, a salience threshold can be defined such that when a count reaches the threshold level, the associated candidate template can be considered salient and useful for training a virtual assistant to recognize the template in the future. In other words, counts associated with candidate templates can be used to determine whether particular candidate templates are received so frequently as to warrant training a virtual assistant to recognize the candidate template in the future. A generated notification can include the associated candidate template. In some examples, the notification can also include additional information that can be useful for training a virtual assistant to recognize the candidate template, such as contextual information relating to the original unrecognized user requests (e.g., dates, times, near-in-time requests, user profile information, etc.). The generated notification can be directed to administrators of the virtual assistant software, to a user, to software associated with a virtual assistant, or the like.

In some examples, the most frequently generated candidate template can yield a request template that corresponds to and can be responsive to a wide variety of specific user requests. For example, several candidate templates can be related and can correspond to the same or a similar function, and selecting the most frequently generated candidate template can yield a request template that satisfies a large number of potential user requests. In addition, in some examples, generating candidate request templates and tracking the frequency of receipt can be used to generate a ranked list of candidate templates similar to that illustrated in FIG. 3. Such a ranked list can be useful for system administrators, users, or others to recognize potential areas for improving a virtual assistant, for understanding current request trends, for understanding user dialogue, for monitoring requests received in a particular domain, or the like. It should be understood that many other benefits are also possible.

Referring again to process 220 of FIG. 2, at block 240, a virtual assistant can be trained with salient candidate templates having associated counts exceeding a threshold level. For example, after a notification is generated at block 238 including a particular candidate template, the candidate template can be used at block 240 to train a virtual assistant to recognize the candidate template in the future and respond appropriately. Training a virtual assistant to recognize the candidate template can include incorporating the candidate template into a language model along with an associated function that can be an appropriate response to receiving a corresponding request. For example, the candidate template and an associated function can be added to language model database 112 of system 100 in FIG. 1. Training can also be performed in other ways to enable a virtual assistant to recognize and respond to a new template.

The function associated with a salient candidate template can be defined in any number of ways. In one example, a system administrator, user, or other person can define a particular function that a virtual assistant can use in responding to receipt of a candidate request template. In other examples, contextual information relating to received requests can be used to determine a desired functionality (e.g., using near-in-time requests to determine a likely desired function for an unrecognized request). Various other approaches can also be used to determine a corresponding function with which to train a virtual assistant to respond to a candidate request template.

Figure 4:
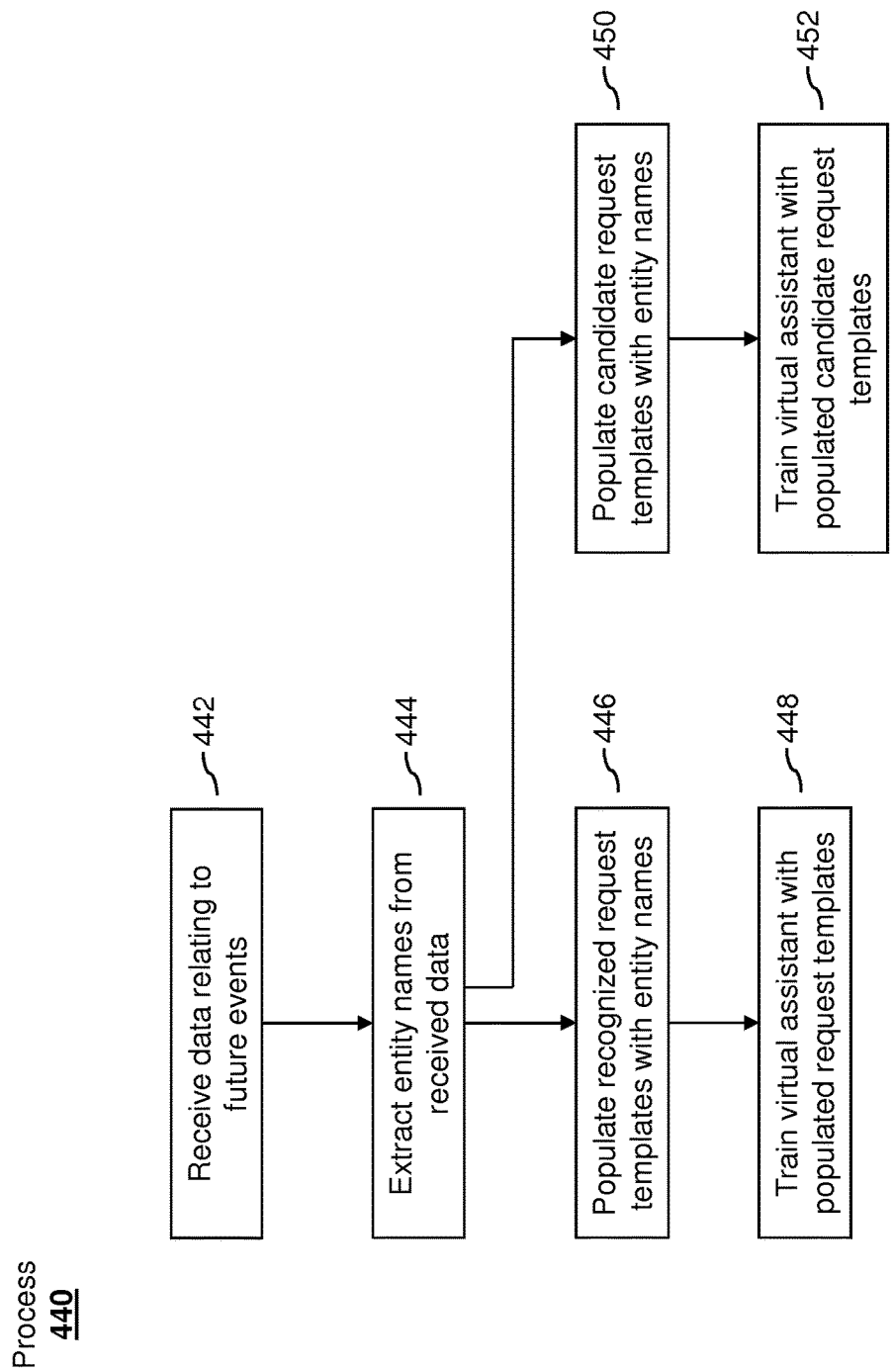
FIG. 4 illustrates an exemplary process for training a virtual assistant to recognize anticipated future requests.

FIG. 4 illustrates exemplary process 440 for training a virtual assistant to recognize anticipated future requests. As available information, news, events, and the like change over time, user interactions with a virtual assistant can also change. Process 440 can be used in some examples to prepare a virtual assistant for new anticipated user requests. At block 442, data relating to future events can be received. Such data can come from a variety of sources and relate to a variety of events. For example, data can be received from a variety of news feeds, blogs, announcement pages, corporate websites, RSS feeds, information aggregators, social media sites, or the like. Data can relate to any of a variety of future events, such as a movie premiering, a restaurant opening, a business relocating, a new product being released, a meeting taking place, a speech being given, a holiday approaching, a politician taking office, a sports event, or the like.

Received data can include any of a variety of information relating to future events. For example, for an upcoming movie premier, received data can include a movie title, actor names, plot information, director names, producer names, filming locations, premier/release date, theater locations, or the like. For a restaurant opening, received data can include a restaurant name, location, business hours, head chef, owner, opening date, associated restaurants, job opportunities, or the like. For a sports game being played, received data can include team names, event location, event date, event time, ticketing information, arena information, related statistics, or the like. Thus, a wide variety of information can be received relating to a wide variety of future events, and it should be appreciated that the examples enumerated herein are not limiting of the types of data and types of future events that can be used in executing process 440.

At block 444, entity names can be extracted from the data received at block 442. In one example, received information can be parsed or categorized into recognizable entities or variables. For example, a location or address can be extracted from received data (e.g., recognized as a location or address and delineated) and designated as the location or address associated with a future event; a release date, opening date, event date, or the like can be extracted from received data (e.g., recognized as a date) and designated as a significant date associated with a future event; a person's name and any associated title, role, position, or the like can be extracted from received data and correlated with a future event; and a variety of other information can be extracted from received data and categorized. In some examples, extracted entities can be stored in a database, table, or the like that can indicate how an extracted entity name corresponds to a future event or to what variables an entity name might relate. For example, for a new movie, an actor's name can be extracted from a data feed and designated as relating to a variety of variables or entities that can appear in request templates, such as "actor," "star," "role," or the like. Extracted entity names can also be stored and categorized in a variety of other ways that can be useful for subsequent virtual assistant training.

At block 446, recognized request templates can be populated or seeded with entity names, thereby generating populated request templates (e.g., particular utterances, example uses, example phrases, etc.). In one example, entity names relating to a future event can be used to populate or seed some or all related request templates in a corresponding domain (e.g., insert entity names where there are variables in request templates). For example, for a new movie, extracted entity names can be inserted into some or all of the recognized request templates in a movie domain: an extracted movie title can be used to populate any request template with a related movie title variable, such as <MOVIE_TITLE> in the template "Where is <MOVIE_TITLE> playing;" an extracted movie type can be used to populate any request template with a related movie type variable, such as <MOVIE_TYPE> in the template "Identify new <MOVIE_TYPE> movies," an actor's name can be used to populate any request template with a related actor variable, such as <ACTOR> in the template "Identify new movies starring <ACTOR>;" and so on. In other examples, a predetermined subset of recognized request templates in a domain can be populated with new entity names.

Some example populated request templates are illustrated in FIG. 3 in language model database 112 including "Identify new 'horror' movies," "Identify new 'thriller' movies," and "Identify new 'comedy' movies." The examples shown correspond to the recognized request template "Identify new <MOVIE_TYPE> movies." Entity names "honor," "thriller," and "comedy" have been populated in the variable <MOVIE_TYPE> to generate the illustrated populated request templates.

Referring again to process 440 of FIG. 4, at block 448, a virtual assistant can be trained with populated request templates. In some examples, populated request templates can improve virtual assistant request recognition by providing expected example utterances a virtual assistant can employ as a reference during request recognition. When a request is received, virtual assistant recognition software can compare a received request to a populated request template to recognize a user's request and disambiguate the user's intent. For example, where requests are ambiguous and can be perceived as different strings of words, the request can be compared to known populated request templates to determine whether one of the potential interpretations is expected or more likely to be correct. The movie title "Argo," for instance, might sound like "hour go," "are go," "our go," "argh oh," "Argo," or other words. A populated request template like "Where is 'Argo' playing," however, can be used to recognize that a user is requesting information relating to the movie title "Argo" as opposed to one of the other possible interpretations.

Training at block 448 can be performed in a variety of ways. In some examples, populated request templates from block 446 can be stored in a database associated with a virtual assistant, such as a language model database or an acoustic model database. As illustrated in FIG. 3, for example, populated request templates can be stored in language model database 112 along with recognized request templates. To recognize what a user wants and determine what action a virtual assistant should perform, a received user request can be compared to recognized request templates, populated request templates, or both. In other examples, populated request templates can be employed in other ways to train a virtual assistant to correctly recognize requests and avoid errors of misunderstanding user intent.

In some examples, entity names extracted at block 444 from newly received data can be used in other ways for virtual assistant request recognition. At block 450, for example, candidate request templates can be populated with entity names in a manner similar to block 446. As discussed above, candidate request templates can include user requests that a virtual assistant may not yet recognize and to which a virtual assistant may not yet be trained to respond. At block 450, candidate request templates can be populated with new entity names to generate populated candidate request templates. As illustrated in FIG. 3, for instance, candidate request templates stored in candidate database 114 can be populated with entity names to generate populated candidate request templates (not shown). For example, data relating to a new movie based on a book series can be received, corresponding entity names can be extracted from the data, and the entity names can be used to populate variables in corresponding candidate request templates, such as "Identify movies based on <BOOK_SERIES>" and "Identify <BOOK_SERIES> movies" shown in FIG. 3. Resulting populated candidate request templates might include, for instance, "Identify movies based on 'The Lord of the Rings'" and "Identify 'The Lord of the Rings' movies."

At block 452, a virtual assistant can be trained with populated candidate request templates in a manner similar to block 448. In some examples, a virtual assistant can be trained with both new candidate request templates and corresponding populated candidate request templates. For example, at block 240 in process 220 of FIG. 2, in addition to training a virtual assistant with new salient candidate request templates, the virtual assistant can be trained with populated candidate request templates generated according to process 440. In some examples, such training can include adding new request templates and/or new populated request templates to a language model associated with the virtual assistant. Process 440 can thus be used in multiple ways for virtual assistant recognition of anticipated future user requests.

Figure 5:
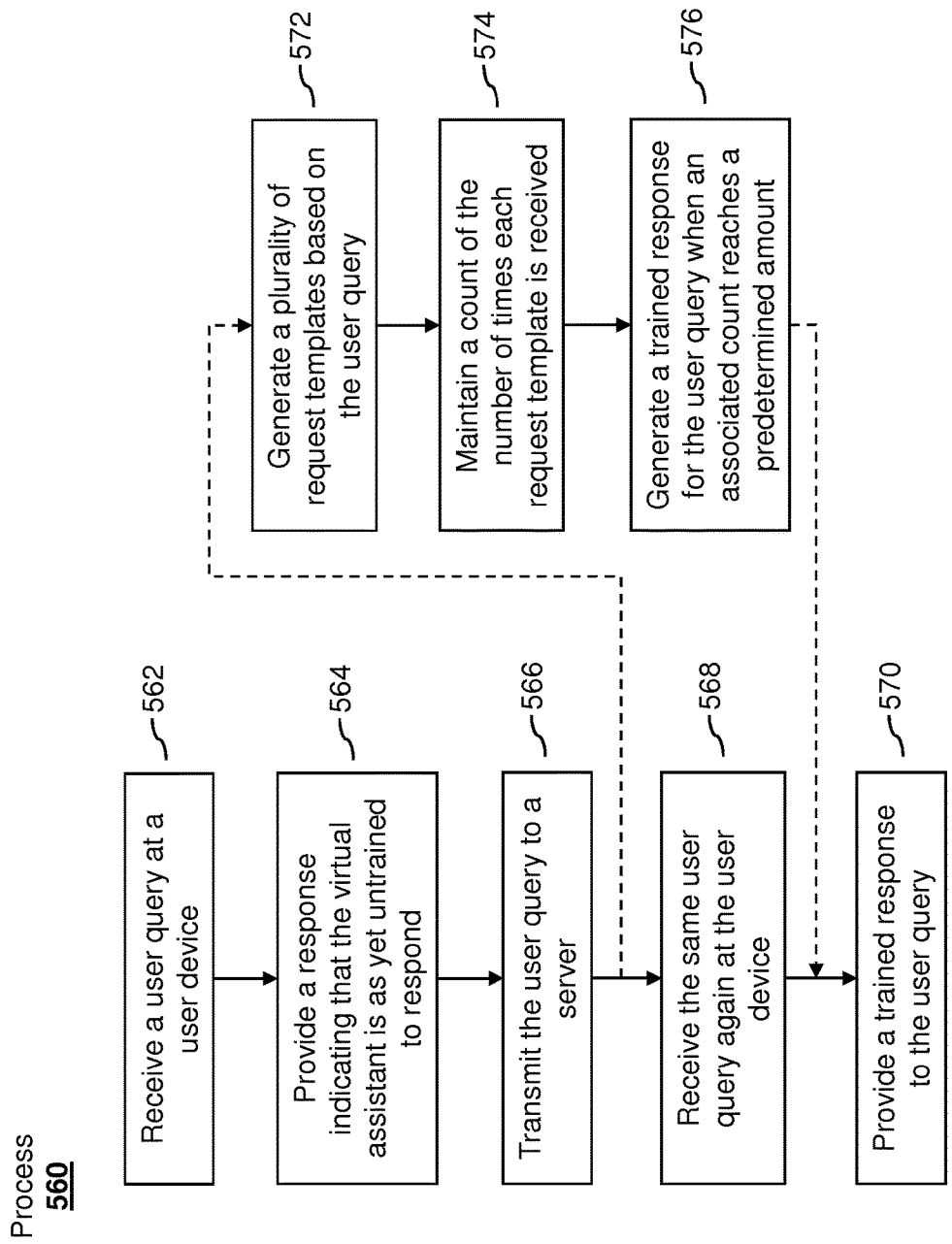
FIG. 5 illustrates an exemplary process for facilitating user interactions with a virtual assistant associated with a user device.

FIG. 5 illustrates exemplary process 560 for facilitating user interactions with a virtual assistant associated with a user device. In some instances, process 560 can be performed by a user device, such as user device 102 of system 100 in FIG. 1. In other instances, process 560 can be performed by a user device in conjunction with a server, such as server 110 of system 100 in FIG. 1. Moreover, in some examples, process 560 can be performed together in a coordinated manner with other processes—such as with process 220 of FIG. 2 and process 440 of FIG. 4—for virtual assistant request recognition.

At block 562, a user query or user request can be received at a user device. A user query can be directed toward a virtual assistant and can include any command, request, question, statement, or the like. A user query can also be received in any form, including text, voice, gestures, images, or the like. At block 564, a response can be provided indicating that the virtual assistant is as yet untrained to respond to the received user query. For example, as discussed above with respect to blocks 224 and 226 of process 220, a received request may not yet be recognized by a virtual assistant, or a virtual assistant may otherwise not yet be trained to provide a response to a received query. In some examples, the user query can be transmitted to a server for processing, and the server can indicate to the user device that a trained response is unavailable. Providing a response at block 564 can include causing text to be displayed, causing audio to be played, causing text to be read out, causing an image to be displayed, or the like. It should be appreciated that the response need not be a particular message, but might include a tone, image, word, or the like that can indicate to a user that the virtual assistant is untrained to respond substantively to the particular request. In other examples, the virtual assistant can prompt the user for additional information (e.g., repeat the request, restate the request, confirm interpretation, query whether a related web search is desired, etc.).

At block 566, the user query can be transmitted to a server. In some examples, an audio file of the user query can be transmitted to a server. In other examples, contextual information relating to the user query can be transmitted to the server along with the user query (e.g., near-in-time requests, user profile information, date, time, etc.). In some examples, transmitting the user query to the server at block 566 can be done prior to providing a response at block 564 (e.g., the user query can be transmitted to a server, the server can indicate that no trained response is available, and a corresponding response can then be provided). In other examples, a user query can be transmitted to a first server for processing to determine whether a trained response is available, and can be transmitted to a second server upon determination that no trained response is available.

At block 568, the same user query can again be received at the user device. As at block 562, the user query can be received in any of a variety of ways and can again be directed to a virtual assistant associated with the device. At block 570, in contrast to the response at 564, a trained response to the user query can be provided (e.g., a response that appropriately/substantively responds to the user query, provides the requested information, performs the desired function, etc.). In some examples, the trained response to the user query can be provided by a server associated with the virtual assistant. In some instances, the virtual assistant can learn such a trained response according to process 220 of FIG. 2 after receiving the user query at block 562 and transmitting the user query to a server at block 566.

In some examples, the steps at blocks 572, 574, and 576 can be performed to train the virtual assistant to recognize and provide a response to the user query received at block 562, such that the virtual assistant is able to provide a trained response at block 570 after receiving the same user query again at block 568. At block 572, a plurality of request templates can be generated based on the user query received at block 562. For example, the plurality of request templates can be generated in a similar manner as described above with reference to block 230 of process 220 in FIG. 2. At block 574, a count can be maintained of the number of times each request template is received. For example, such a count can be maintained in a similar manner as described above with reference to blocks 232, 234, and 236 of process 220 in FIG. 2. At block 576, a trained response can be generated for the user query when an associated count reaches a predetermined amount. For example, a trained response can be generated and incorporated into a virtual assistant in a similar manner as described above with reference to blocks 238 and 240 of FIG. 2. In other examples, a notification can be generated indicating that an associated count has reached a threshold level, and a system administrator, user, or the like can provide an appropriate response that can be used to train the virtual assistant to respond to the corresponding query.

Figure 6:
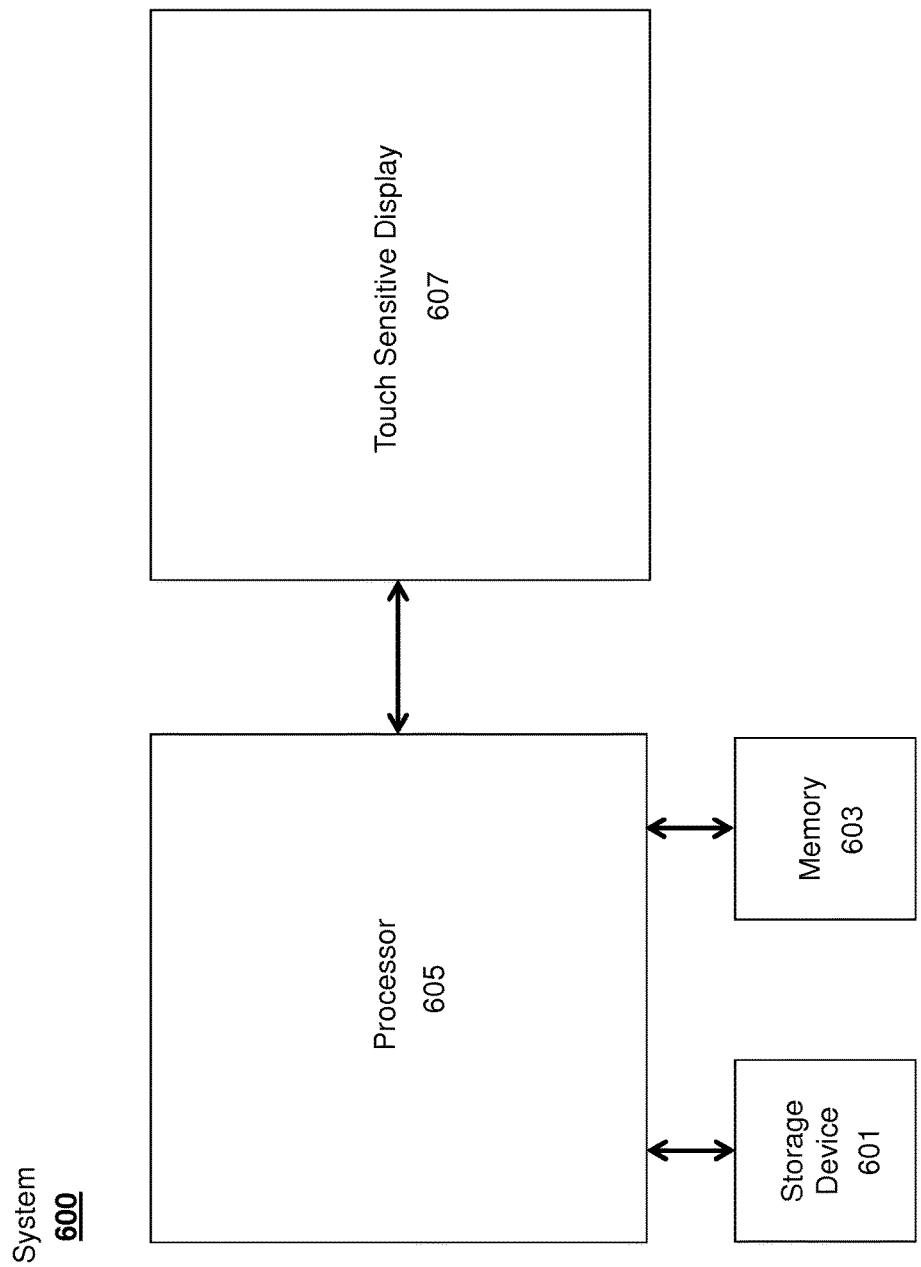
FIG. 6 illustrates an exemplary system that can be used for request recognition for a virtual assistant.

One or more of the functions described above relating to virtual assistant request recognition can be performed by a system similar or identical to system 600 shown in FIG. 6. System 600 can include instructions stored in a non-transitory computer readable storage medium, such as memory 603 or storage device 601, and executed by processor 605. The instructions can also be stored and/or transported within any non-transitory computer readable storage medium for use by or in connection with an instruction execution system, apparatus, or device, such as a computer-based system, processor-containing system, or other system that can fetch the instructions from the instruction execution system, apparatus, or device and execute the instructions. The non-transitory computer readable storage medium can include, but is not limited to, a semiconductor system, apparatus, or device, a portable computer diskette (magnetic), a random access memory (RAM) (magnetic), a read-only memory (ROM) (magnetic), an erasable programmable read-only memory (EPROM) (magnetic), a portable optical disc such as CD, CD-R, CD-RW, DVD, DVD-R, or DVDRW, or flash memory such as compact flash cards, secured digital cards, USB memory devices, memory sticks, and the like.

The instructions can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate, or transport the program for use by or in connection with the instruction execution system, apparatus, or device. The transport medium can include, but is not limited to, an electronic, magnetic, optical, electromagnetic, or infrared wired or wireless propagation medium.

System 600 can further include touch sensitive display 607 coupled to processor 605. Touch sensitive display 607 can be configured for users to interact with a virtual assistant along with other components (e.g., a microphone).

It is to be understood that the system is not limited to the components and configuration of FIG. 6, but can include other or additional components in multiple configurations according to various examples. Additionally, the components of system 600 can be included within a single device, or can be distributed between multiple devices. In some examples, processor 605 can be located within touch sensitive display 607.

Figure 7:
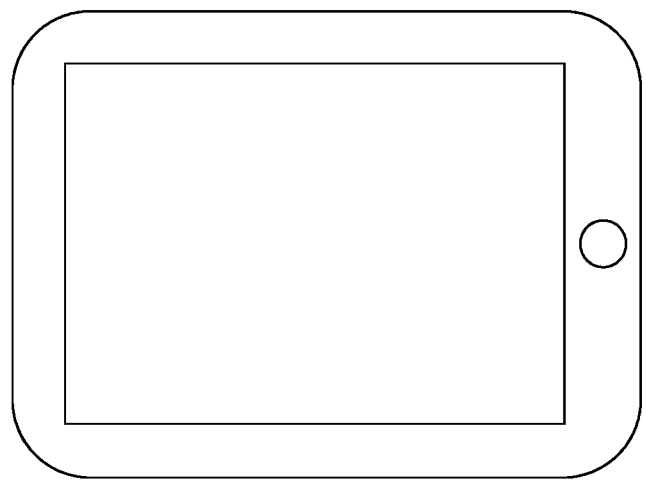
FIG. 7 illustrates an exemplary personal device that can be configured to provide a virtual assistant interface according to various examples.

FIG. 7 illustrates an exemplary personal device 700, such as a tablet, that can be configured to provide a virtual assistant interface according to various examples.

Figure 8:
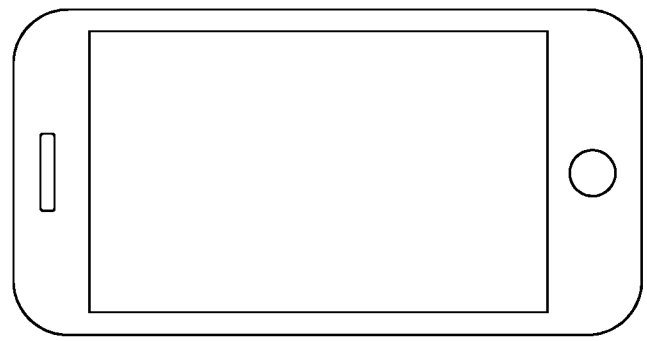
FIG. 8 illustrates another exemplary personal device that can be configured to provide a virtual assistant interface according to various examples.

FIG. 8 illustrates another exemplary personal device 800, such as a mobile phone, that can be configured to provide a virtual assistant interface according to various examples.

Therefore, according to the above, some examples of the disclosure are directed to a method for request recognition for a virtual assistant, the method comprising: receiving a textual representation of user speech; generating a plurality of request templates based on the textual representation; associating a count with a request template of the plurality of request templates based on a number of times the request template is received; and in response to a determination that the count is more than a predetermined amount, generating a notification including the request template. Additionally or alternatively to one or more of the examples disclosed above, in some examples a method for request recognition for a virtual assistant can further comprise: in response to a determination that the count is more than the predetermined amount, training a language model with the request template, the language model associated with the virtual assistant. Additionally or alternatively to one or more of the examples disclosed above, in some examples a method for request recognition for a virtual assistant can further comprise: in response to a determination that the count is more than the predetermined amount, generating a plurality of populated templates, each of the plurality of populated templates comprising one of the plurality of generated request templates populated with an entity. Additionally or alternatively to one or more of the examples disclosed above, in some examples a method for request recognition for a virtual assistant can further comprise: training a language model with the plurality of populated templates. Additionally or alternatively to one or more of the examples disclosed above, in some examples each of the generated plurality of request templates comprises at least one word or phrase that indicates a language domain and at least one entity related to the language domain. Additionally or alternatively to one or more of the examples disclosed above, in some examples a method for request recognition for a virtual assistant can further comprise: receiving contextual data relating to the textual representation of user speech; wherein the plurality of request templates is generated based on the textual representation and the contextual data relating to the textual representation.

According to the above, other examples of the disclosure are directed to a system for request recognition for a virtual assistant, the system comprising: a memory; and a processor capable of: receiving a textual representation of user speech; generating a plurality of request templates based on the textual representation; associating a count with a request template of the plurality of request templates based on a number of times the request template is received; and in response to a determination that the count is more than a predetermined amount, generating a notification including the request template.

According to the above, other examples of the disclosure are directed to a method for facilitating user interactions with a virtual assistant associated with a user device, the method comprising: receiving a first user query at the user device; providing a response indicating that the virtual assistant is untrained to respond to the first user query; transmitting the first user query to a server associated with the virtual assistant; receiving a second user query at the user device, wherein the second user query is the same as the first user query; and in response to receiving the second user query, providing a trained response. Additionally or alternatively to one or more of the examples disclosed above, in some examples the trained response is determined by: generating a plurality of request templates based on the first user query; associating a count with a request template of the plurality of request templates based on a number of times the request template is received; and in response to a determination that the count is more than a predetermined amount, generating the trained response. Additionally or alternatively to one or more of the examples disclosed above, in some examples the trained response comprises a search result associated with the second user query.

According to the above, other examples of the disclosure are directed to a method for request recognition for a virtual assistant, the method comprising: receiving data comprising a reference to a future event; extracting an entity name from the received data, wherein the entity name describes the future event; generating a plurality of populated request templates based on the extracted entity name; and training a language model of the virtual assistant with the plurality of populated request templates. Additionally or alternatively to one or more of the examples disclosed above, in some examples generating the plurality of populated request templates based on the extracted entity name comprises: inserting the extracted entity name into a plurality of request templates recognizable by the virtual assistant. Additionally or alternatively to one or more of the examples disclosed above, in some examples a method for request recognition further comprises: inserting the extracted entity name into a first request template recognizable by the virtual assistant; receiving a second request template as yet unrecognized by the virtual assistant; and generating a candidate populated request template based on the extracted entity name by inserting the extracted entity name into the second request template. Additionally or alternatively to one or more of the examples disclosed above, in some examples a method for request recognition further comprises: training the language model of the virtual assistant with the candidate populated request template.

According to the above, other examples of the disclosure are directed to a method for request recognition for a virtual assistant, the method comprising: receiving a textual transcription of user speech; comparing the textual transcription to one or more first request templates recognizable by the virtual assistant; in response to a first match between the textual transcription and the first request template being found, causing an action to be performed corresponding to the first match; and in response to no first match being found: generating a plurality of second request templates based on the textual transcription; comparing each of the plurality of second request templates to one or more third request templates as yet unrecognized by the virtual assistant; incrementing a count associated with a second request template in response to a second match between the second request template and a third request template being found; and storing a second request template in response to a matching third request template not being found. Additionally or alternatively to one or more of the examples disclosed above, in some examples a method for request recognition further comprises: in response to a determination that the incremented count is more than a predetermined threshold, generating a notification including the second request template. Additionally or alternatively to one or more of the examples disclosed above, in some examples a method for request recognition further comprises: in response to no first match being found, training a language model with at least one of the plurality of generated second request templates. Additionally or alternatively to one or more of the examples disclosed above, in some examples a method for request recognition further comprises: in response to no first match being found, generating a plurality of populated request templates, each of the plurality of populated request templates comprising one of the plurality of generated second request templates populated with an entity; and training a language model with the plurality of populated request templates. Additionally or alternatively to one or more of the examples disclosed above, in some examples the action to be performed comprises causing a search result associated with the first match to be displayed. Additionally or alternatively to one or more of the examples disclosed above, in some examples each of the plurality of second request templates comprises at least one word or phrase that indicates a language domain. Additionally or alternatively to one or more of the examples disclosed above, in some examples a method for request recognition further comprises: receiving contextual data relating to the textual transcription of user speech; wherein the plurality of second request templates is generated based on the textual transcription and the contextual data relating to the textual transcription.

According to the above, other examples of the disclosure are directed to a system for request recognition for a virtual assistant, the system comprising: a memory; and a processor capable of: receiving a textual transcription of user speech; comparing the textual transcription to one or more first request templates recognizable by the virtual assistant; in response to a first match between the textual transcription and the first request template being found, causing an action to be performed corresponding to the first match; and in response to no first match being found: generating a plurality of second request templates based on the textual transcription; comparing each of the plurality of second request templates to one or more third request templates as yet unrecognized by the virtual assistant; incrementing a count associated with a second request template in response to a second match between the second request template and a third request template being found; and storing a second request template in response to a matching third request template not being found. Additionally or alternatively to one or more of the examples disclosed above, in some examples the processor is further capable of: in response to a determination that the incremented count is more than a predetermined threshold, generating a notification including the second request template. Additionally or alternatively to one or more of the examples disclosed above, in some examples the processor is further capable of: in response to no first match being found, training a language model with at least one of the plurality of generated second request templates. Additionally or alternatively to one or more of the examples disclosed above, in some examples the processor is further capable of: in response to no first match being found, generating a plurality of populated request templates, each of the plurality of populated request templates comprising one of the plurality of generated second request templates populated with an entity; and training a language model with the plurality of populated request templates.

Although examples have been fully described with reference to the accompanying drawings, it is to be noted that various changes and modifications will become apparent to those skilled in the art. Such changes and modifications are to be understood as being included within the scope of the various examples as defined by the appended claims.

What is claimed is:

1. A method for request recognition for a virtual assistant, the method comprising:
   receiving a textual transcription of user speech;
   comparing the textual transcription to one or more first request templates recognizable by the virtual assistant:
   in response to a first match between the textual transcription and the first request template being found, causing the virtual assistant to perform an action corresponding to the first match; and
   in response to no first match being found, training the virtual assistant by:
      generating a plurality of second request templates based on the textual transcription;
      comparing each of the plurality of second request templates to one or more third request templates as yet unrecognized by the virtual assistant;
      incrementing a count associated with a second request template in response to a second match between the second request template and a third request template being found;
      storing a second request template in response to a matching third request template not being found;
      receiving a second textual transcription of user speech, wherein the second textual transcription of user speech is recognized as matching the second request template by the virtual assistant;
      determining whether the count associated with the second request template is greater than a predetermined amount; and
      in accordance with a determination that the count associated with the second request template is greater than a predetermined amount, generating a trained response to the second textual transcription with the virtual assistant.

2. The method of claim 1, further comprising:
   in response to a determination that the incremented count is more than a predetermined threshold, generating a notification including the second request template.

3. The method of claim 2, wherein generating the notification including the second request template further comprises generating a display including the second request template and contextual information associated with the textual transcription.

4. The method of claim 1, further comprising:
   in response to no first match being found, training a language model with at least one of the plurality of generated second request templates.

5. The method of claim 1, further comprising:
   in response to no first match being found, generating a plurality of populated request templates, each of the plurality of populated request templates comprising one of the plurality of generated second request templates populated with an entity; and
   training a language model with the plurality of populated request templates.

6. The method of claim 1, wherein the action to be performed comprises causing a search result associated with the first match to be displayed.

7. The method of claim 1, wherein each of the plurality of second request templates comprises at least one word or phrase that indicates a language domain.

8. The method of claim 1, further comprising:
receiving contextual data relating to the textual transcription of user speech;
wherein the plurality of second request templates is generated based on the textual transcription and the contextual data relating to the textual transcription.

9. The method of claim 1, wherein at least one of the first request template, the second request template, or the third request template includes at least one variable corresponding to at least one type of a plurality of entities.

10. A system for request recognition for a virtual assistant, the system comprising:
a memory; and
a processor capable of:
receiving a textual transcription of user speech;
comparing the textual transcription to one or more first request templates recognizable by the virtual assistant;
in response to a first match between the textual transcription and the first request template being found, causing the virtual assistant to perform an action corresponding to the first match; and
in response to no first match being found, training the virtual assistant by:
generating a plurality of second request templates based on the textual transcription;
comparing each of the plurality of second request templates to one or more third request templates as yet unrecognized by the virtual assistant;
incrementing a count associated with a second request template in response to a second match between the second request template and a third request template being found;
storing a second request template in response to a matching third request template not being found;
receiving a second textual transcription of user speech, wherein the second textual transcription of user speech is recognized as matching the second request template by the virtual assistant;
determining whether the count associated with the second request template is greater than a predetermined amount; and
in accordance with a determination that the count associated with the second request template is greater than a predetermined amount, generating a trained response to the second textual transcription with the virtual assistant.

11. The system of claim 10, the processor further capable of:
in response to a determination that the incremented count is more than a predetermined threshold, generating a notification including the second request template.

12. The system of claim 11, wherein generating the notification including the second request template further comprises generating a display including the second request template and contextual information associated with the textual transcription.

13. The system of claim 10, the processor further capable of:
in response to no first match being found, training a language model with at least one of the plurality of generated second request templates.

14. The system of claim 10, the processor further capable of:
in response to no first match being found, generating a plurality of populated request templates, each of the plurality of populated request templates comprising one of the plurality of generated second request templates populated with an entity; and
training a language model with the plurality of populated request templates.

15. The system of claim 10, wherein at least one of the first request template, the second request template, or the third request template includes at least one variable corresponding to at least one type of a plurality of entities.

16. A non-transitory computer readable storage medium storing one or more programs, the one or more programs comprising instructions for request recognition for a virtual assistant, which when executed by one or more processors of an electronic device, cause the device to:
receive a textual transcription of user speech;
compare the textual transcription to one or more first request templates recognizable by the virtual assistant;
in response to a first match between the textual transcription and the first request template being found, cause the virtual assistant to perform an action corresponding to the first match; and
in response to no first match being found, training the virtual assistant by:
generate a plurality of second request templates based on the textual transcription;
compare each of the plurality of second request templates to one or more third request templates as yet unrecognized by the virtual assistant;
increment a count associated with a second request template in response to a second match between the second request template and a third request template being found;
store a second request template in response to a matching third request template not being found;
receive a second textual transcription of user speech, wherein the second textual transcription of user speech is recognized as matching the second request template by the virtual assistant;
determine whether the count associated with the second request template is greater than a predetermined amount; and
in accordance with a determination that the count associated with the second request template is greater than a predetermined amount, generate a trained response to the second textual transcription with the virtual assistant.

17. The non-transitory computer readable storage medium of claim 16, wherein the one or more programs comprise further instructions, which when executed by the one or more processors, cause the device to:
in response to a determination that the incremented count is more than a predetermined threshold, generate a notification including the second request template.

18. The non-transitory computer readable storage medium of claim 17, wherein generating the notification including the second request template further comprises generating a display including the second request template and contextual information associated with the textual transcription.

19. The non-transitory computer readable storage medium of claim 16, wherein the one or more programs comprise further instructions, which when executed by the one or more processors, cause the device to:

in response to no first match being found, train a language model with at least one of the plurality of generated second request templates.

20. The non-transitory computer readable storage medium of claim 16, wherein the one or more programs comprise further instructions, which when executed by the one or more processors, cause the device to:
in response to no first match being found, generate a plurality of populated request templates, each of the plurality of populated request templates comprising one of the plurality of generated second request templates populated with an entity; and
train a language model with the plurality of populated request templates.

21. The non-transitory computer readable storage medium of claim 16, wherein the action to be performed comprises causing a search result associated with the first match to be displayed.

22. The non-transitory computer readable storage medium of claim 16, wherein each of the plurality of second request templates comprises at least one word or phrase that indicates a language domain.

23. The non-transitory computer readable storage medium of claim 16, wherein the one or more programs comprise further instructions, which when executed by the one or more processors, cause the device to:
receive contextual data relating to the textual transcription of user speech;
wherein the plurality of second request templates is generated based on the textual transcription and the contextual data relating to the textual transcription.

24. The non-transitory computer readable storage medium of claim 16, wherein at least one of the first request template, the second request template, or the third request template includes at least one variable corresponding to at least one type of a plurality of entities.

25. A method for request recognition for a virtual assistant, the method comprising:
receiving a textual transcription of a user request;
comparing the textual transcription to one or more first request templates recognizable by the virtual assistant;
determining, based on a result of comparing the textual transcription to one or more first request templates recognizable by the virtual assistant, whether the virtual assistant is trained to respond to the user request;
in accordance with a determination that the virtual assistant is trained to respond to the user request, causing the virtual assistant to perform a trained action corresponding to a match between the textual transcription and the one or more first request templates; and
in accordance with a determination that the virtual assistant is not trained to respond to the user request, automatically training the virtual assistant to respond to the user request by:
generating a plurality of second request templates based on the textual transcription;
comparing each of the plurality of second request templates to one or more third request templates to which the virtual assistant has yet to be trained to respond
incrementing a count associated with a second request template in response to a second match between the second request template and a third request template being found;
storing a second request template in response to a matching third request template not being found;
receiving a second textual transcription of user speech, wherein the second textual transcription of user speech is recognized as matching the second request template by the virtual assistant;
determining whether the count associated with the second request template is greater than a predetermined amount; and
in accordance with a determination that the count associated with the second request template is greater than a predetermined amount, automatically training the virtual assistant by generating a trained response to the second textual transcription.

* * * * *

UNITED STATES PATENT AND TRADEMARK OFFICE
CERTIFICATE OF CORRECTION

PATENT NO.      : 10,296,160 B2
APPLICATION NO. : 14/099776
DATED           : May 21, 2019
INVENTOR(S)     : Rushin N. Shah et al.

Page 1 of 1

It is certified that error appears in the above-identified patent and that said Letters Patent is hereby corrected as shown below:

In the Claims

In Column 18, Line 14, Claim 1, delete "assistant:" and insert -- assistant; --, therefor.

Signed and Sealed this
Twenty-first Day of April, 2020

Andrei Iancu
*Director of the United States Patent and Trademark Office*